(12) United States Patent
Kim et al.

(10) Patent No.: US 7,298,727 B2
(45) Date of Patent: Nov. 20, 2007

(54) POWER CONTROL METHOD AND APPARATUS USING CONTROL INFORMATION IN MOBILE COMMUNICATION SYSTEM

(75) Inventors: Youn-Sun Kim, Seongnam-si (KR); Hwan-Joon Kwon, Gyeonggi-do (KR); Dong-Hee Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 661 days.

(21) Appl. No.: 10/802,149

(22) Filed: Mar. 17, 2004

(65) Prior Publication Data

US 2004/0199814 A1  Oct. 7, 2004

(30) Foreign Application Priority Data

Mar. 17, 2003 (KR) .................. 10-2003-0016455
Apr. 7, 2003 (KR) .................. 10-2003-0021661

(51) Int. Cl.
*H02H 3/05* (2006.01)
(52) U.S. Cl. .................... 370/342; 714/18; 714/758

(58) Field of Classification Search ................ 714/758, 714/18; 370/342; 455/452.2
See application file for complete search history.

(56) References Cited

U.S. PATENT DOCUMENTS

| | | | |
|---|---|---|---|
| 5,909,434 A * | 6/1999 | Odenwalder et al. | 370/342 |
| 6,289,037 B1 | 9/2001 | Gibbons et al. | |
| 6,438,119 B1 | 8/2002 | Kim et al. | |
| 2003/0014709 A1* | 1/2003 | Miyoshi et al. | 714/758 |
| 2004/0199814 A1* | 10/2004 | Kim et al. | 714/18 |

FOREIGN PATENT DOCUMENTS

| | | |
|---|---|---|
| KR | 10-2002-0071226 | 9/2002 |
| WO | WO 99/52224 | 10/1999 |

* cited by examiner

*Primary Examiner*—William D. Cumming
(74) *Attorney, Agent, or Firm*—The Farrell Law Firm, P.C.

(57) ABSTRACT

A method and apparatus for performing power control using control information of a traffic channel in a mobile communication system that transmits the control information of the traffic channel over a control channel.

52 Claims, 21 Drawing Sheets

POWER CONTROL METHOD AND APPARATUS USING CONTROL INFORMATION IN MOBILE COMMUNICATION SYSTEM

PRIORITY

This application claims priority to an application entitled "POWER CONTROL METHOD AND APPARATUS USING CONTROL INFORMATION IN MOBILE COMMUNICATION SYSTEM", filed in the Korean Intellectual Property Office on Mar. 17, 2003 and assigned Serial No. 2003-16455, and an application entitled "POWER CONTROL METHOD AND APPARATUS USING CONTROL INFORMATION IN MOBILE COMMUNICATION SYSTEM", filed in the Korean Intellectual Property Office on Apr. 7, 2003 and assigned Serial No. 2003-21661, the contents of each of which are incorporated herein by reference.

BACKGROUND OF THE INVENTION

1. Field of the Invention

The present invention relates to a mobile communication system, and more particularly to an apparatus and method for transmitting and receiving error check information of control information to maintain uniform reception of control information transmitted from a terminal.

2. Description of the Related Art

Typical mobile communication systems may be divided into two types according to their applications. The first type supports a voice service and the second type supports a data service. A typical mobile communication system is a Code Division Multiple Access (CDMA) system. One of the currently used CDMA system, which supports only a voice service, complies with the International Standard (IS)-95 and the IS-95 based specifications. As the communication technology has developed along with users' demands, the mobile communication system has gradually evolved to the point where it supports a high rate data service. For example, a 1st generation CDMA 2000 (CDMA 2000 1×) system was designed to simultaneously support both the voice and audio services, whereas a 1×Evolution in Data Only (EVDO) system was designed to support only the high rate data service by allocating to the data service all resources achievable by the CDMA 2000 1× system.

The mobile communication system generally performs transmission in two directions: forward and reverse. The forward direction is from a base station, which covers a predetermined area (referred to as a "cell"), to a mobile terminal capable of moving between cells. The reverse direction is from the mobile terminal to the base station.

In the reverse transmission of user data in the mobile communication system as described above, the user data is transmitted at a rate of 0 kbps (i.e. no data to be transmitted), 9.6 kbps, 19.2 kbps, 38.4 kbps, 76.8 kbps or 153.6 kbps over a Reverse Traffic Channel (R-TRCH). The base station controls only the maximum allowable data rate of the R-TRCH, while the mobile terminal selects the actual data rate to use from among data rates that are less than the maximum allowable data rate. A Reverse Rate Indicator (RRI), which indicates a reverse data rate to be used by the mobile terminal, is reported to the base station over a Reverse Rate Indicator Channel (R-RICH).

FIG. 1 shows an exemplary structure of the R-RICH. As shown, an RRI of the R-RICH 110 is transmitted in the same time interval (or duration) as data traffic of a corresponding traffic channel 120 at time intervals of 26.67 ms. If a frame is defined as a data unit transmitted in each time interval, an RRI for a traffic channel carrying an i-th frame is transmitted in an i-th time interval. The RRI is composed of 3 bits, and the RRI's values are mapped to data rates as shown in the following table.

TABLE 1

| Data Rate | RRI |
|---|---|
| 0 kbps | 000 |
| 9.6 kbps | 001 |
| 19.2 kbps | 010 |
| 38.4 kbps | 011 |
| 76.8 kbps | 100 |
| 153.6 kbps | 101 |
| reserved | 110 |
| reserved | 111 |

In order to receive the i-th frame of the traffic channel, the base station first receives control information, which is transmitted over the R-RICH in the same time interval as the i-th frame (i.e. in the i-th time interval), and then performs channel decoding and de-spreading for the traffic channel.

FIG. 2 is a block diagram showing the configuration of a R-RICH transmitter for transmitting R-RICH signals from a mobile terminal in a mobile communication system. A Reverse Rate Indicator (RRI) symbol, composed of 3 bits, is transmitted at intervals of 16 slots.

As shown in FIG. 2, a simplex encoder 210 encodes 3-bit RRI symbols to output coded symbols. A codeword repeater 220 repeats the coded symbols in a predetermined repeated pattern (for example, a predetermined number of times). A puncturer 230 punctures the last 3 symbols of the repeated symbols from the repeater 220. A Time Division Multiplexer (TDM) 240 multiplexes the output of the puncturer 230 and a pilot-channel input sequence of all "0" symbols and outputs 128 binary symbols every slot. A signal point mapper 250 performs +1/−1 mapping (i.e., 0/1 →+1/−1) on the symbols output from the multiplexer 204. A Walsh spreader 260 spreads the output of the signal point mapper 250 by multiplying the output by predetermined Walsh codes for transmission over the R-RICH.

The R-RICH as shown in FIG. 1 and a traffic channel relating thereto receive the R-RICH signal transmitted by the transmitter as shown in FIG. 2, but can only decode the traffic channel signal only if there is no error in decoding the received R-RICH signal. If there is a decoding error of the R-RICH, the base station receiver cannot detect the actual data rate of the traffic channel, making error-free decoding difficult. Thus, it is very important for the 1×EVDO system to perform suitable power control to achieve a sufficiently-low reception error probability of the R-RICH since the reception performance of traffic signals is affected by the reception performance of the R-RICH signals.

Two types of power control are performed in the mobile communication system. The first type is inner loop power control, in which transmission power is controlled to allow the bit energy per noise ratio (Eb/Nt) of the R-RICH to approach a predetermined target setpoint. The second is outer loop power control, in which if an error has occurred in the received data, the target setpoint is increased; otherwise, the target setpoint is decreased.

However, the base station cannot determine whether there is an error in the decoded data received over the R-RICH, since additional information needed for determining whether there is an error in the decoded result is not transmitted from the mobile terminal over the R-RICH, as shown in FIG. 2. Thus, the mobile terminal must allocate sufficiently-high transmission power to the R-RICH, so that in any wireless environment the base station can receive the R-RICH signal with an error probability at a level lower than a predetermined limit value. However, such an increase in power increases interference with other channels.

SUMMARY OF THE INVENTION

The present invention solves the above problem, and it is an object of the present invention to provide a method and apparatus for transmitting from a mobile terminal control information of a reverse traffic channel, together with information relating to error detection of the control information.

It is another object of the present invention to provide a method and apparatus for performing in a base station power control based on error detection of control information of a reverse traffic channel.

In accordance with one aspect of the present invention, the above and other objects can be accomplished by providing a method for performing power control using control information of a traffic channel in a mobile communication system, transmitting the control information of the traffic channel over a control channel, the method comprising the steps of a) selecting control information of a traffic channel in every time interval; b) generating error detection information so as to perform power control depending on whether an error occurs in at least one predetermined recent control information; and c) encoding the generated error detection information, together with control information of a predetermined time interval, in said predetermined time interval, and transmitting the encoded information over a control channel.

In accordance with another aspect of the present invention, there is provided a method for performing power control using control information of a traffic channel in a mobile communication system transmitting the control information of the traffic channel over a control channel, the method comprising the steps of a) selecting control information of a traffic channel in every time interval; b) encoding and transmitting the control information over a control channel; and c) encoding error detection information generated for at least one predetermined recent control information in a predetermined time interval, and transmitting the generated error detection information over an error detection channel different from the control channel, so as to perform power control depending on whether an error occurs in the control information.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted when it may obscure the subject matter of the present invention.

In the following description, a channel used to transmit the control information of a traffic channel signal transmitted by a mobile terminal will be referred to as a control channel of the traffic channel. The control channel signal may include information relating to a Hybrid Automatic Repeat reQuest (HARQ), in addition to information relating to the data rate of the reverse traffic channel. In the HARQ technology, if a negative acknowledgement (NAK) is received in response to a transmitted data frame, the same data is retransmitted, but if an acknowledgement (ACK) is received, the next data is transmitted.

In a mobile communication system, in order for a base station to maintain uniform error probability of a control channel signal transmitted by a mobile terminal through the outer loop power control, it is required to determine whether an error occurs in the decoded result of the control channel. The simplest way to determine whether an error occurs in the control channel is to transmit a Cyclic Redundancy Code (CRC) corresponding to the control information each time the mobile terminal transmits the control information over a time interval during which the control channel signal is transmitted. This process allows the base station to determine, based on the CRC, whether there is an error in the control information, each time the base station receives the control information, and then allows the base station to perform the outer loop power control based on the determined result.

However, the control information is generally a very small amount of information, whereas the CRC is composed of 6, 8 or 16 bits, which is relatively large, compared to the control information. If the control information and the relatively-large CRC are transmitted together, higher transmission power is required to transmit the CRC even though almost the same performance is achieved as when only the control information is transmitted. However, as the transmission power increases, interference caused by the increased power of the control channel also increases. For example, when a 6-bit CRC is added to transmit an 8-bit control information, interference caused by the control channel increases by 75%, compared to when no CRC is added.

A description will now be given of several embodiments according to the present invention, whereby interference caused by the transmission of control information over the control channel increases by only a relatively small amount even when the control information is transmitted after adding a CRC thereto. In the following, a separate description will be given for each embodiment.

1. First Embodiment

Figure 1:
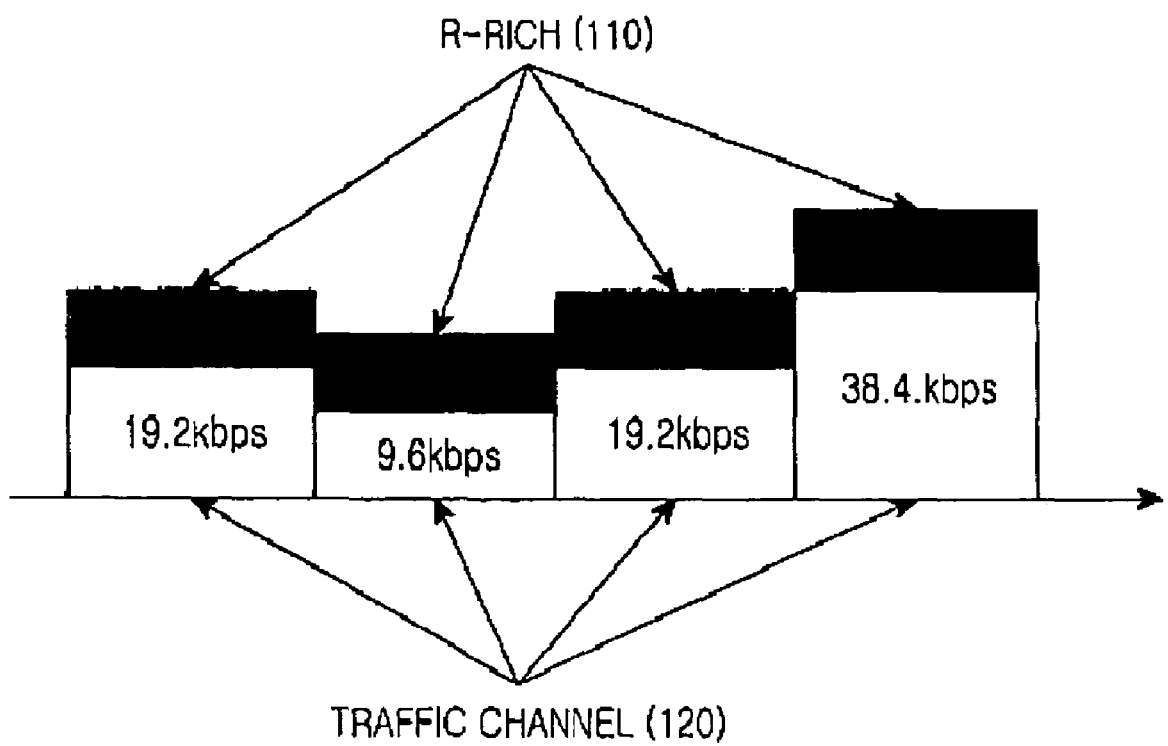
FIG. 1 is a diagram illustrating the structure of a Reverse Rate Indicator Channel (R-RICH)
Figure 2:
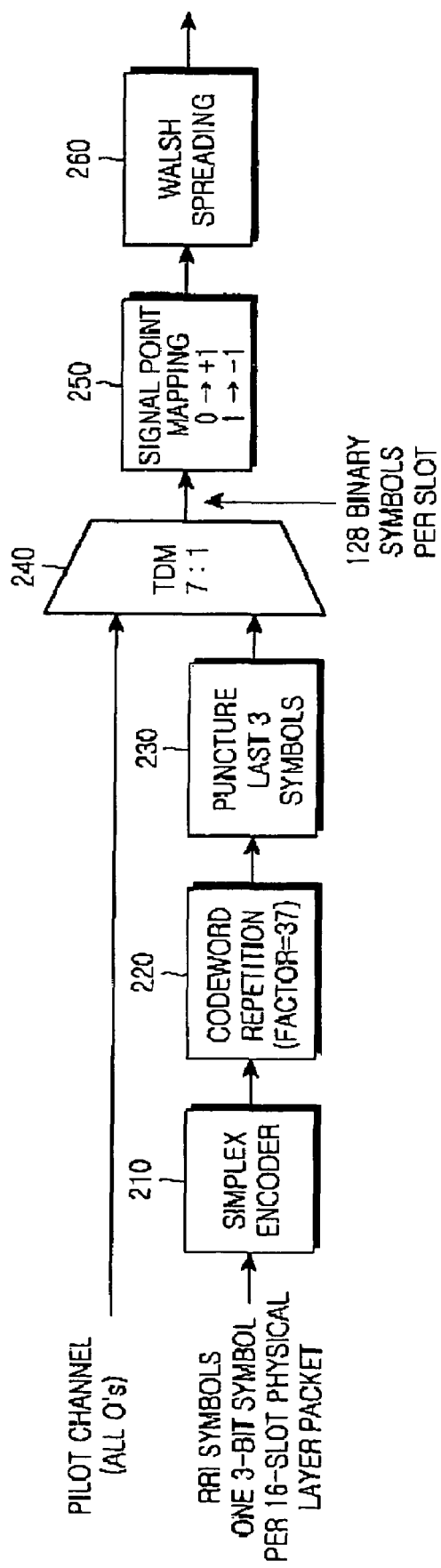
FIG. 2 is a block diagram showing the configuration of a R-RICH transmitter for transmitting R-RICH signals from a mobile terminal in a mobile communication system.
Figure 3:
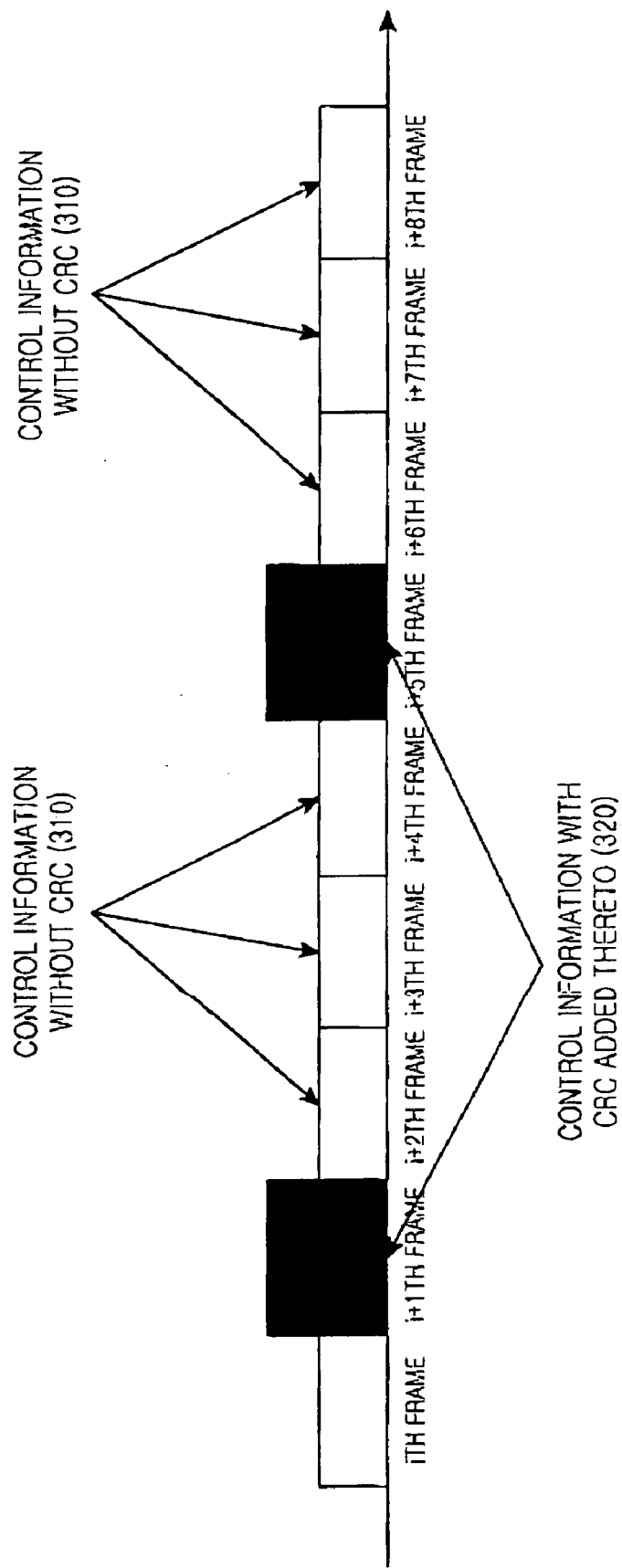
FIG. 3 is a diagram illustrating the transmission of control information and a CRC from a mobile terminal according to a first embodiment of the present invention.

FIG. 3 is a diagram illustrating the transmission of control information and a CRC from a mobile terminal according to a first embodiment of the present invention. As shown in this figure, the mobile terminal transmits the control information with the CRC added thereto in a predetermined time interval or intervals of the control channel as denoted by reference numeral "320", whereas it transmits only the control information during the remaining time intervals as denoted by reference numeral "310". The predetermined time interval during which the CRC is added to the control information is prescribed between the base station and the mobile terminal. FIG. 3 does not show a traffic channel signal transmitted together with the control channel signal.

As shown in FIG. 3, the mobile terminal transmits control information with a CRC added thereto in every 4th frame. In other words, the mobile terminal transmits the control information with the CRC added thereto only in i+1th and i+5th frames, whereas it transmits only the control information in the remaining frames (i.e., ith, i+2th, i+4th, i+6th, i+7th, and i+8th frames).

The base station performs a decoding operation, as a counterpart operation to the encoding operation at the transmitter, for control channel signals received in the i+1th and i+5th frames prescribed between the base station and the mobile terminal, so as to obtain control information and a CRC. After obtaining the control information and the CRC, the base station checks the CRC to determine whether there is an error in the decoded control information. If it is determined from the CRC check that an error has occurred, a power control target setpoint is increased through the outer loop power control; otherwise, the power control target setpoint is decreased through the outer loop power control.

The base station performs a decoding operation, as a counterpart operation to the encoding operation at the transmitter, for control channel signals received in the remaining frames, other than the i+1th and i+5th frames, so as to obtain control information. Since no CRC is additionally transmitted in the remaining frames, no outer loop power control is performed during the time interval corresponding to the remaining frames.

Figure 4:
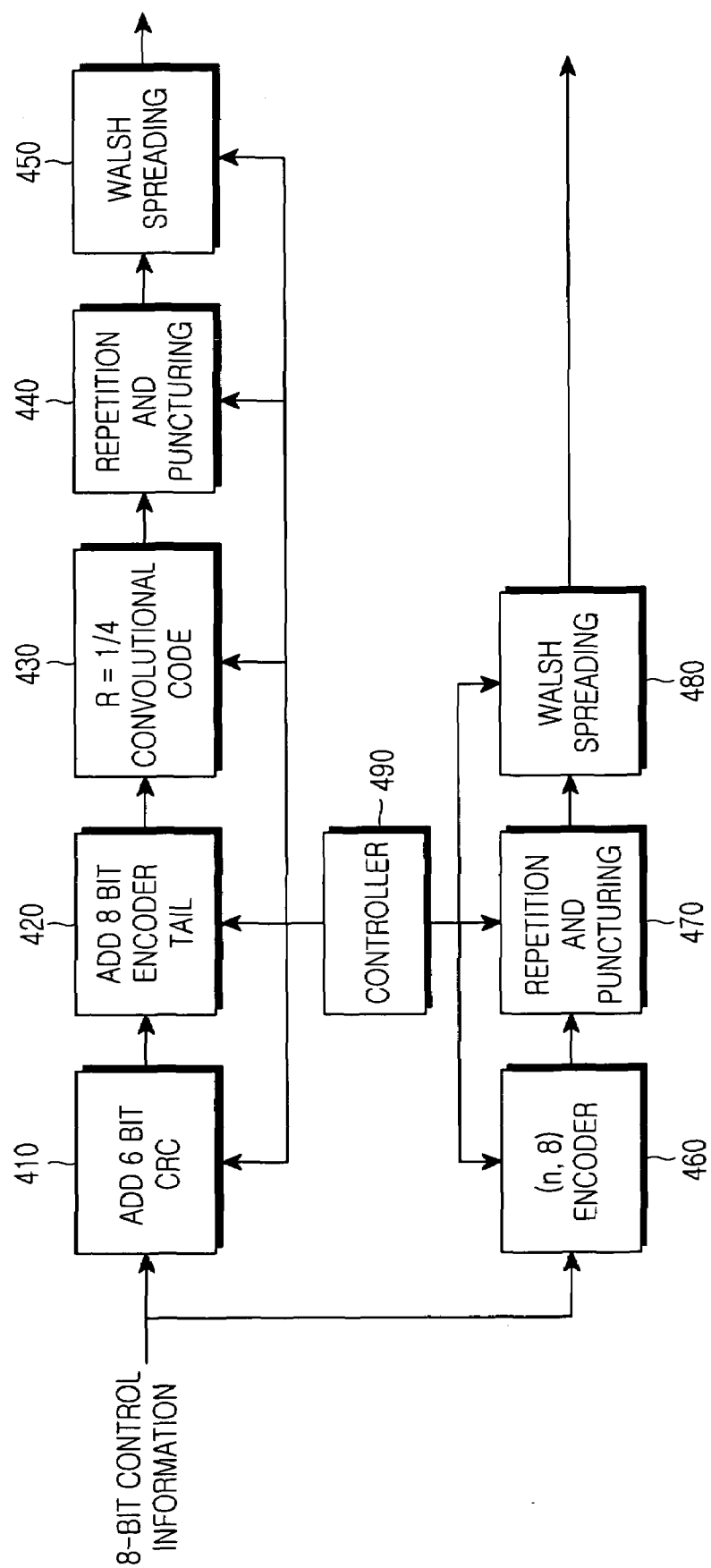
FIG. 4 is a block diagram showing the configuration of a control channel transmitter for transmitting control channel signals from a mobile terminal according to the first embodiment of the present invention.

FIG. 4 is a block diagram showing the configuration of a control channel transmitter for transmitting control channel signals from a mobile terminal according to the first embodiment of the present invention. A control information generator (not shown) generates the control information. Here, it is assumed that control information transmitted over the control channel consists of 8 bits. The 8-bit control information includes for example various types of information relating to the HARQ and the data rate of a traffic channel in a 1×EVDO system. The 8-bit control information is transmitted using elements 410, 420, 430, 440 and 450, or using elements 460, 470 and 480, depending on whether the control information is transmitted together with the CRC.

In FIG. 4, during the time interval defined for transmitting the control information with the CRC added thereto, a CRC generator 410 adds a CRC of a predetermined number of bits (for example, a 6-bit CRC) to the 8-bit control information, and outputs 14 bits corresponding to the combination of the 8-bit control information and the 6-bit CRC. A tail bit generator 420 adds an 8-bit encoder tail for convolutionally encoding to the 14-bit output of the CRC generator 410. A convolutional encoder 430 convolutionally encodes the 22-bit output of the tail bit generator 420 at a predetermined code rate (e.g., R=¼). The output of the convolutional encoder 430 is repeated and punctured by a repeater and puncturer 440, after which the output is orthogonally spread (for example, with orthogonal codes) by a Walsh spreader 450.

In FIG. 4, a block encoder 460 block-encodes the 8-bit control information at a predetermined code rate (n, 8) during a time interval defined for transmitting only the control information. An output of the block encoder 460 is repeated and punctured by a repeater and puncturer 470, after which the output is orthogonally spread by a Walsh spreader 480.

A controller 490 controls the operations of the above elements, and particularly determines whether to additionally transmit the CRC each time the control information is transmitted. The controller 490 enables the five elements 410 to 450 during a time interval in which the CRC is to be additionally transmitted, and enables the three elements 460 to 480 during the remaining time interval.

Here, it should be noted that different encoding schemes are required depending on whether the CRC is added. That is, if the control information is transmitted after the CRC is added thereto, the total bits to be transmitted is 14 bits, including the 8 bits of the control information and the 6 bits of the CRC. Accordingly, the convolutional encoder 430 having the code rate of ¼ is used in this case. On the other hand, the convolutional encoder 460 having the code rate (n, 8) is used in the case where only the 8 bit control information is transmitted.

Figure 5:
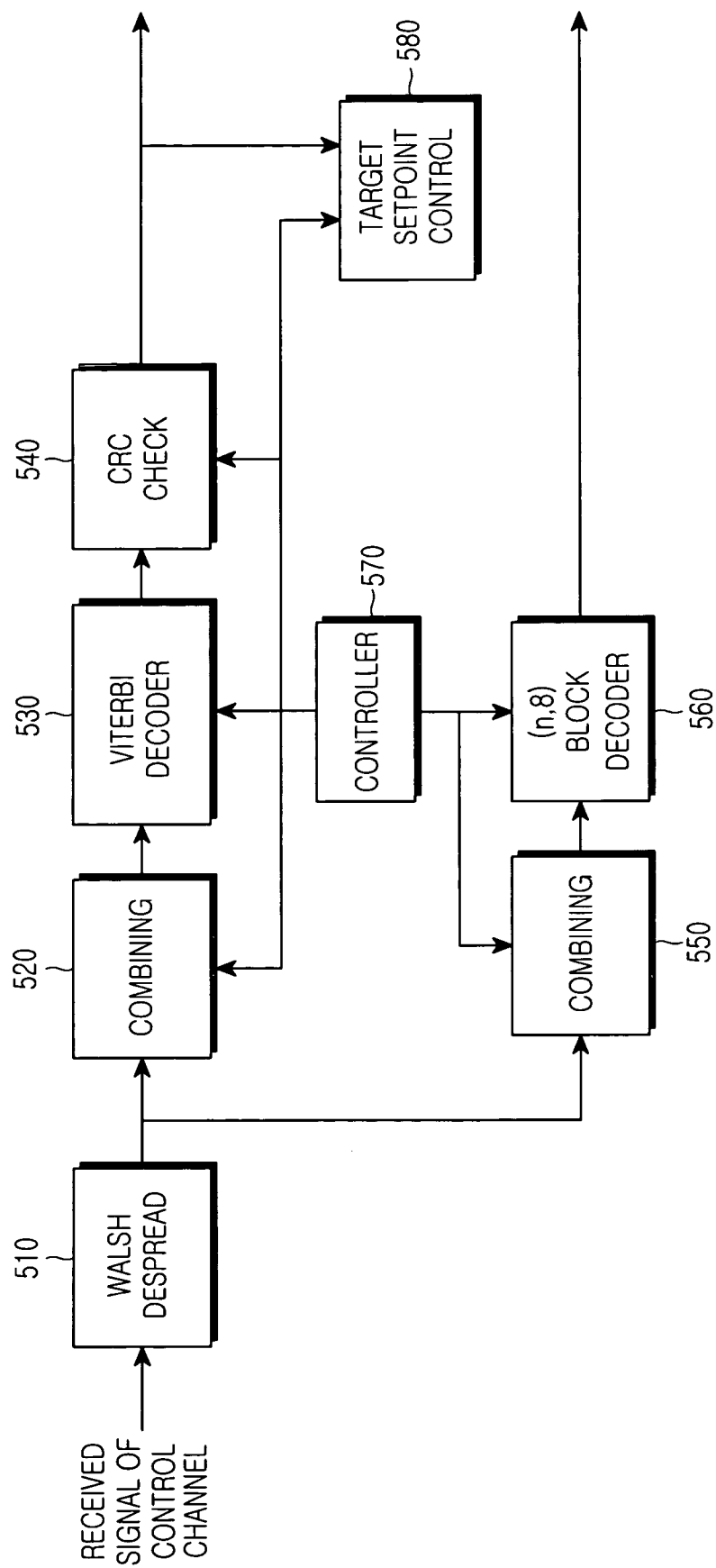
FIG. 5 is a block diagram showing the configuration of a control channel receiver as a counterpart element to the control channel transmitter of FIG. 3.

FIG. 5 is a block diagram showing the configuration of a control channel receiver as a counterpart element to the control channel transmitter of FIG. 3. The control information is received through three elements 520 to 540 (i.e., a combiner 520, a Viterbi decoder 530 and a CRC checker 540), as shown in FIG. 5, during the time interval in which the mobile terminal transmits the control information with the CRC added thereto. The control information is received through two elements 550 and 560 (i.e., a combiner 550 and a block decoder 560) during the remaining time intervals in which only the control information (without the CRC) is transmitted.

In the case where the mobile terminal has transmitted the control information with the CRC added thereto over the control channel, the Walsh despreader 510 of FIG. 5 orthogonally despreads a control channel signal received from the mobile terminal, and the combiner 520 combines outputs of the Walsh despreader 510 during a predetermined time. The combining operation of the combiner 520 is a counterpart operation to the repeating and puncturing operation of the repeater and puncturer 440 of FIG. 4. Thus, the combiner 520 recombines symbols repeated by the repeater and puncturer 440. The Viterbi decoder 530 decodes an output of the combiner 520 in a manner corresponding to the code rate (R=¼) of the convolutional encoder 430 of FIG. 4, and then outputs control information and a CRC. Then, the CRC checker 540 checks the CRC to determine whether there is an error in the control information. The target setpoint controller 580 controls a power control target setpoint according to the determined result by the CRC checker 540. That is, the target setpoint controller 580 increases a target setpoint for the outer loop power control if an error occurs in the control information; otherwise the target setpoint controller 580 decreases the target setpoint.

In the case where the mobile terminal has transmitted only the control information over the control channel, the combiner 550 in FIG. 5 combines outputs of the Walsh despreader 510 during a predetermined time. The combining operation of the combiner 550 is a counterpart operation to the repeating and puncturing operation of the repeater/puncturer 470 of FIG. 4. The block decoder 560 decodes an output of the combiner 550 in a manner corresponding to the code rate (n, 8) of the block encoder 460 of FIG. 4, and then outputs control information.

A controller 570 controls the operations of the above elements, and particularly determines whether there is a CRC added to the control information for each time the control information is received. Here, the time interval in which the control information with the CRC added thereto is transmitted must be prescribed between the mobile terminal and the base station. Based on the periodically received CRCs, the controller 570 can determine whether an error has occurred in the control information, and then perform suitable outer loop power control according to the determined result.

Based on the determination as to whether there is a CRC added to the control information, the controller 570 enables the elements 510, 520, 530, 540 and 580 during the time interval in which the CRC is received, and enables the elements 510, 550 and 560 during the remaining time interval. The control information obtained by the receiver of FIG. 5 is used for the base station to obtain information relating to a corresponding HARQ and data rate when it receives a reverse traffic channel signal.

Figure 6:
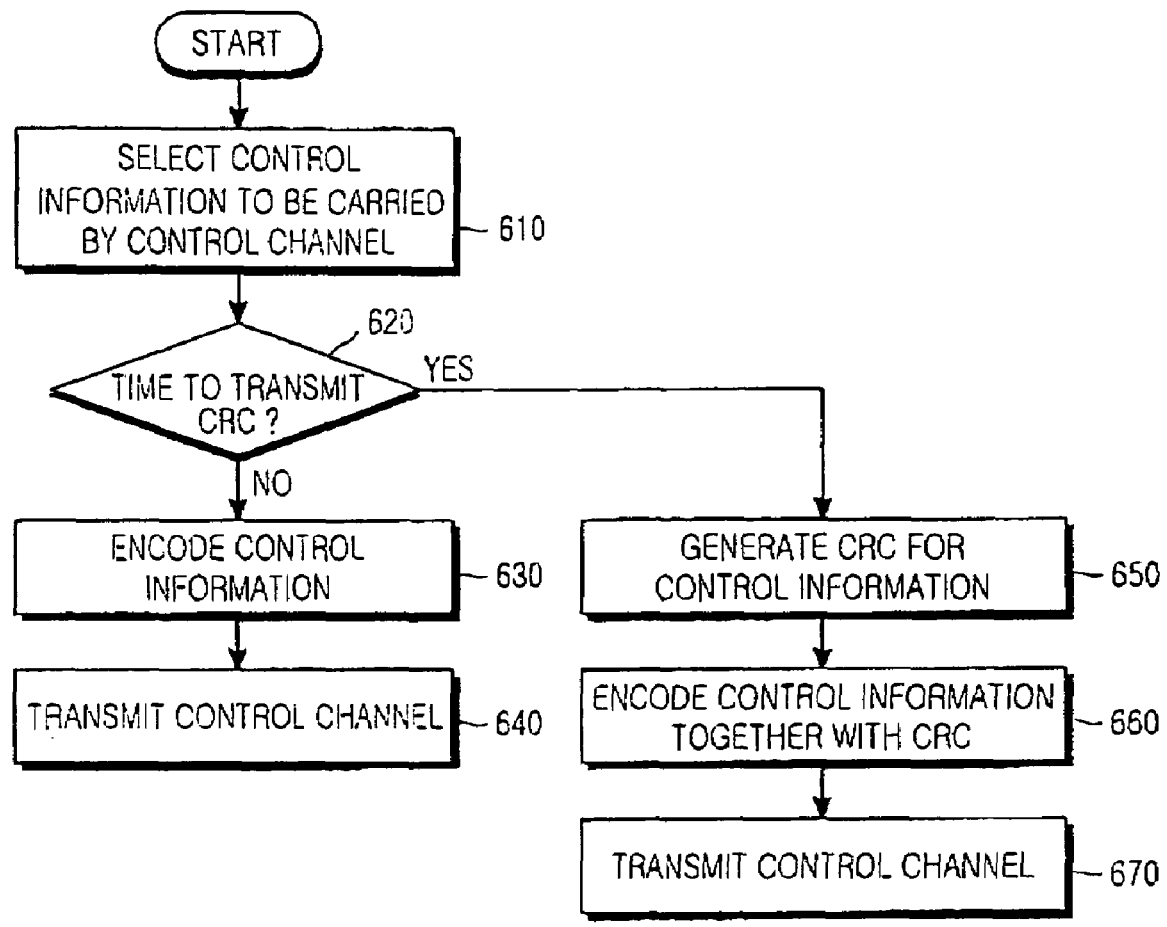
FIG. 6 is a flow chart showing a method for transmitting control information and a CRC from a mobile terminal according to the first embodiment of the present invention.

FIG. 6 is a flow chart showing a method for transmitting control information and a CRC from a mobile terminal according to the first embodiment of the present invention.

As shown in FIG. 6, the mobile terminal selects, at step 610, control information to be carried by a control channel, and then determines, at step 620, whether the current time interval is the time interval in which error detection information is to be transmitted. If the determination at step 620 is negative, the mobile terminal enables the elements 460, 470 and 480 to block-encode the control information at step 630 and transmit the encoded control information at step 640. On the other hand, if the determination at step 620 is positive (i.e., if the current time interval is the time interval in which error detection information is to be transmitted), the mobile terminal generates a CRC for at least one predetermined and recently received control information, at step 650. Then, the mobile terminal enables the elements 410, 420, 430, 440 and 450 shown in FIG. 4 to convolutionally encode the generated CRC and the control information of the current time interval at step 660, and then transmit the convolutionally encoded control information and CRC over the control channel at step 670.

Figure 7:
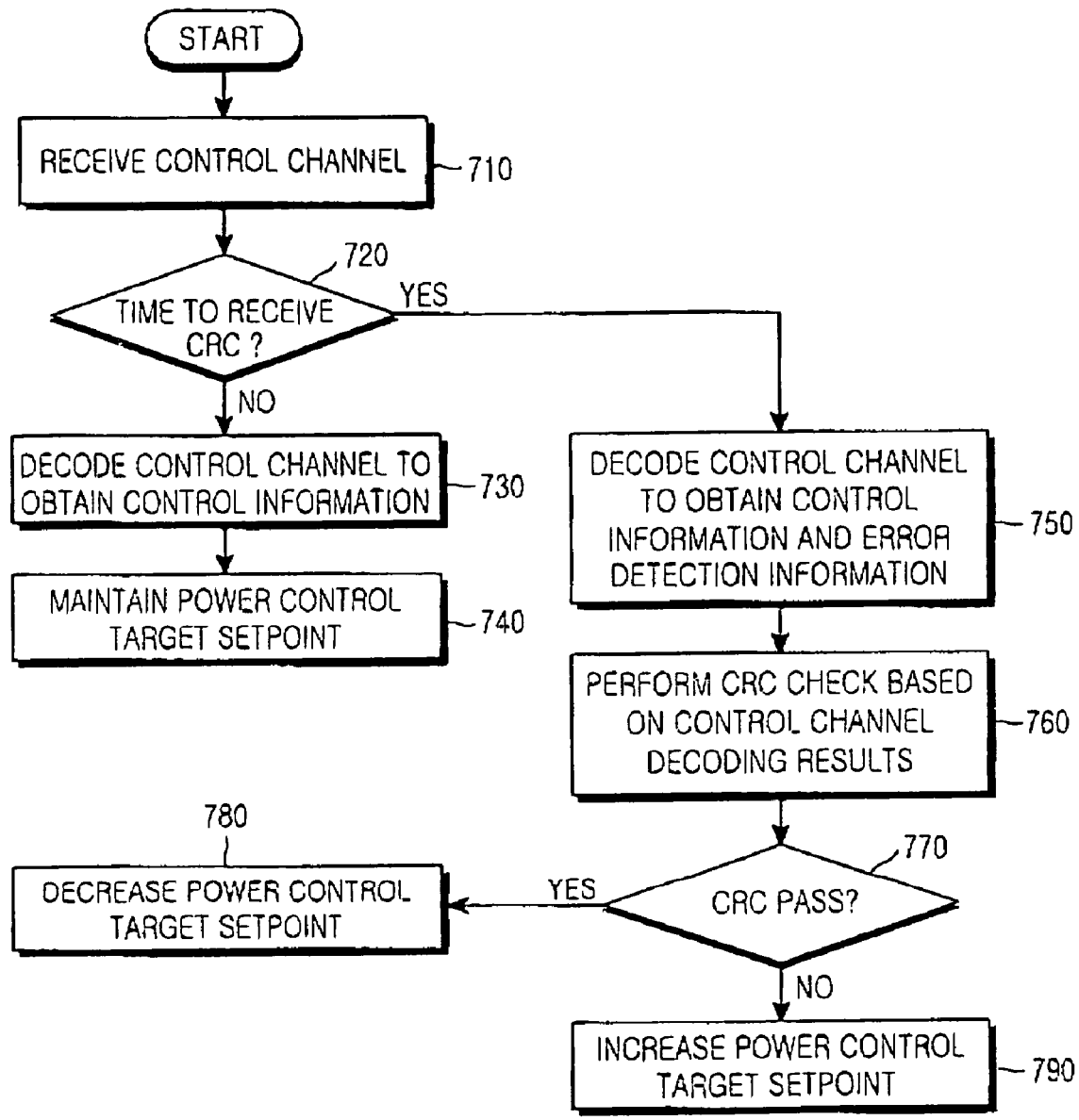
FIG. 7 is a flow chart showing a method for receiving control information and a CRC by a base station according to the first embodiment of the present invention.

FIG. 7 is a flow chart showing a method for receiving control information and a CRC by the base station according to the first embodiment of the present invention.

As shown in FIG. 7, at step 710, the base station receives a control channel signal. Then, at step 720, the base station determines whether the current time interval is the time interval in which it receives error detection information. In order to make this determination, the base station must share a rule used for the mobile terminal to determine, at said step 620 in FIG. 6, during what time interval the error detection information is to be transmitted. The determination as to during what time interval the error detection information is transmitted must be based on a common rule prescribed between the base station and the mobile terminal.

If the determination at step 720 is negative (i.e., if the current time interval is the time interval in which no error detection information is received), at step 730, the base station enables only the elements 550 and 560 in FIG. 5, and decodes a signal received over the control channel to obtain control information. Then, at step 740, the base station maintains the target setpoint for the outer loop power control at the same level as the previous time interval.

On the other hand, if the determination at step 720 is positive (i.e., if the current time interval is the time interval in which error detection information is received), at step 750, the base station enables the elements 520, 530 and 540 in FIG. 5, and decodes a signal received over the control channel to obtain control information of the current time interval and a CRC for the at least one recent control information. Then, at step 760, the base station checks the obtained CRC to determine, at step 770, whether there is an error in the at least one recent control information.

If the determination at step 770 (based on the CRC check result) is that there is no error in the at least one recent control information (i.e., if the CRC check result is "CRC OK"), at step 780, the base station decreases the target setpoint for the outer loop power control by a predetermined level, relative to the previous time interval. On the other hand, if the determination at step 770 is that there is an error in said at least one recent control information (i.e., if the CRC check result is "CRC FAIL"), at step 790, the base station increases the target setpoint for the outer loop power control by a predetermined level, relative to the previous time interval.

The above description has been given with reference to the case where 8-bit control information with a 6-bit CRC added thereto is transmitted. However, in the case where the number of bits of the control information is less than that of the CRC, it is impossible to create a normal CRC. When this occurs, the CRC generator 410 accumulates and receives at least two predetermined recently received control information, and generates a CRC for the at least two accumulated control information, and then outputs the generated CRC, together with the current control information. In this case, the CRC added by the CRC generator 410 is error detection information not just for the current control information but for at least one additional control information that was previously transmitted.

2. Second Embodiment

The present invention may include a second embodiment, as a modification of the first embodiment, in which a CRC is generated for either one frame or a plurality of frames, and the CRC is divided and transmitted in a plurality of frames. In other words, in the second embodiment, the mobile terminal generates a CRC for control information transmitted in one frame or a plurality of frames, and then transmits the CRC together with the control information in a plurality of frames while a plurality of divided parts of the CRC is being transmitted respectively in said plurality of frames.

Figure 8:
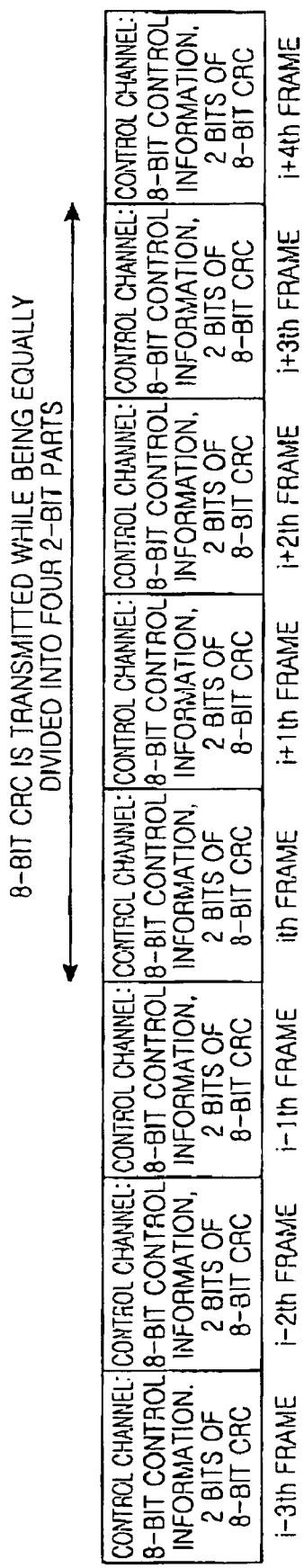
FIG. 8 is a diagram illustrating the transmission of control information and a CRC from a mobile terminal according to a second embodiment of the present invention.

FIG. 8 illustrates the transmission of control information and a CRC from a mobile terminal according to the second embodiment of the present invention.

It can be seen from FIG. 8 that a CRC generated for control information is divided and transmitted over the respective control channels of a plurality of frames as described above. That is, the generated CRC is divided and transmitted in a plurality of frames.

In FIG. 8, an 8-bit CRC generated for one frame or a plurality of frames is equally divided into four 2-bit CRC parts, which are transmitted from the mobile terminal in four frames (i.e., ith, i+1th, i+2th, i+3th frames). As an example where a CRC is generated for control information transmitted in one frame, an 8-bit CRC generated for control information transmitted in the ith frame is transmitted 2 bits by 2 bits in the ith, i+1th, i+2th, i+3th frames. As an example where a CRC is generated for control information transmitted in a plurality of frames, an 8-bit CRC generated for control information transmitted in i−3th, i−2th, i−1th and ith frames is transmitted 2 bits by 2 bits, in ith, i+1th, i+2th and i+3th frames.

Figure 9:
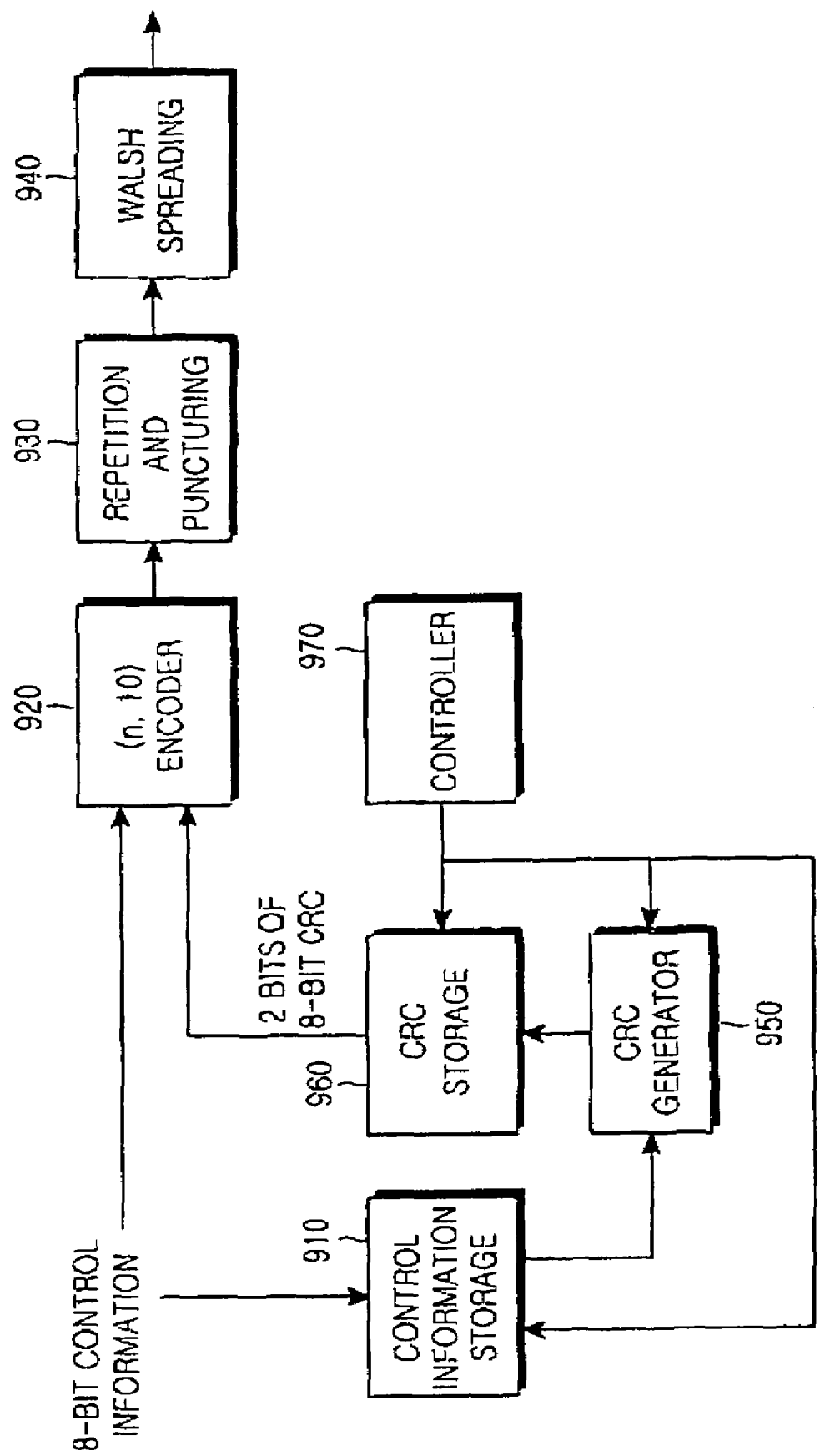
FIG. 9 is a block diagram showing the configuration of a control channel transmitter for transmitting control channel signals from a mobile terminal according to the second embodiment of the present invention.

FIG. 9 is a block diagram showing the configuration of a control channel transmitter for transmitting control channel signals from a mobile terminal according to the second embodiment of the present invention.

FIG. 9 shows the control channel transmitter in the case where the control information is transmitted over a control channel and is composed of 8 bits, and an 8-bit CRC is transmitted in every 4 frames. In this case, 8-bit control information generated per frame is stored in a control information storage unit 910 after it is generated. The reason why the control information is stored in the control information storage unit 910 is to use control information transmitted in a plurality of frames when generating the CRC. If a CRC is generated for error detection of single control information, the control information storage unit 910 stores only the single control information. On the other hand, if a CRC is generated for error detection of a plurality of control information, the control information storage unit 910 stores the plurality of control information.

Once in every 4 frames, a CRC generator 950 generates an 8-bit CRC using control information generated in the most recent 4 frames. The generated 8-bit CRC is inputted to the CRC storage unit 960 and stored therein until the next CRC is generated. The 8 bit CRC is divided into four 2 bit CRC parts and two bits of the 8 bit CRC is input to an encoder 920.

In more detail, the encoder 920 receives both 8-bit control information and 2 CRC bits to be transmitted in every frame, and encodes the received control information and the 2 CRC bits, as shown in FIG. 9. That is, at each time interval 8 bits of control information generated in the corresponding frame and 2 bits of the 8 CRC bits generated in the previous frames are inputted to the encoder 920. We now consider an example where a CRC is generated using control information of the i−3th, i−2th, i−1th and ith frames, and the CRC is divided and transmitted in the ith, i+1th, i+2th and i+3th frames. In this case, the following process occurs: the 8-bit control information and 1st and 2nd bits of the 8 CRC bits are encoded and transmitted in the ith frame; 8-bit control information and 3rd and 4th bits of the 8 CRC bits are encoded and transmitted in the i+1th frame; 8-bit control information and 5th and 6th bits of the 8 CRC bits are encoded and transmitted in the i+2th frame; and 8-bit control information and 7th and 8th bits of the 8 CRC bits are encoded and transmitted in the i+3th frame.

An output signal from the encoder 920 is repeated and punctured by a repeater and puncturer 930, and then transmitted after being orthogonally spread by a Walsh spreader 940.

Figure 10:
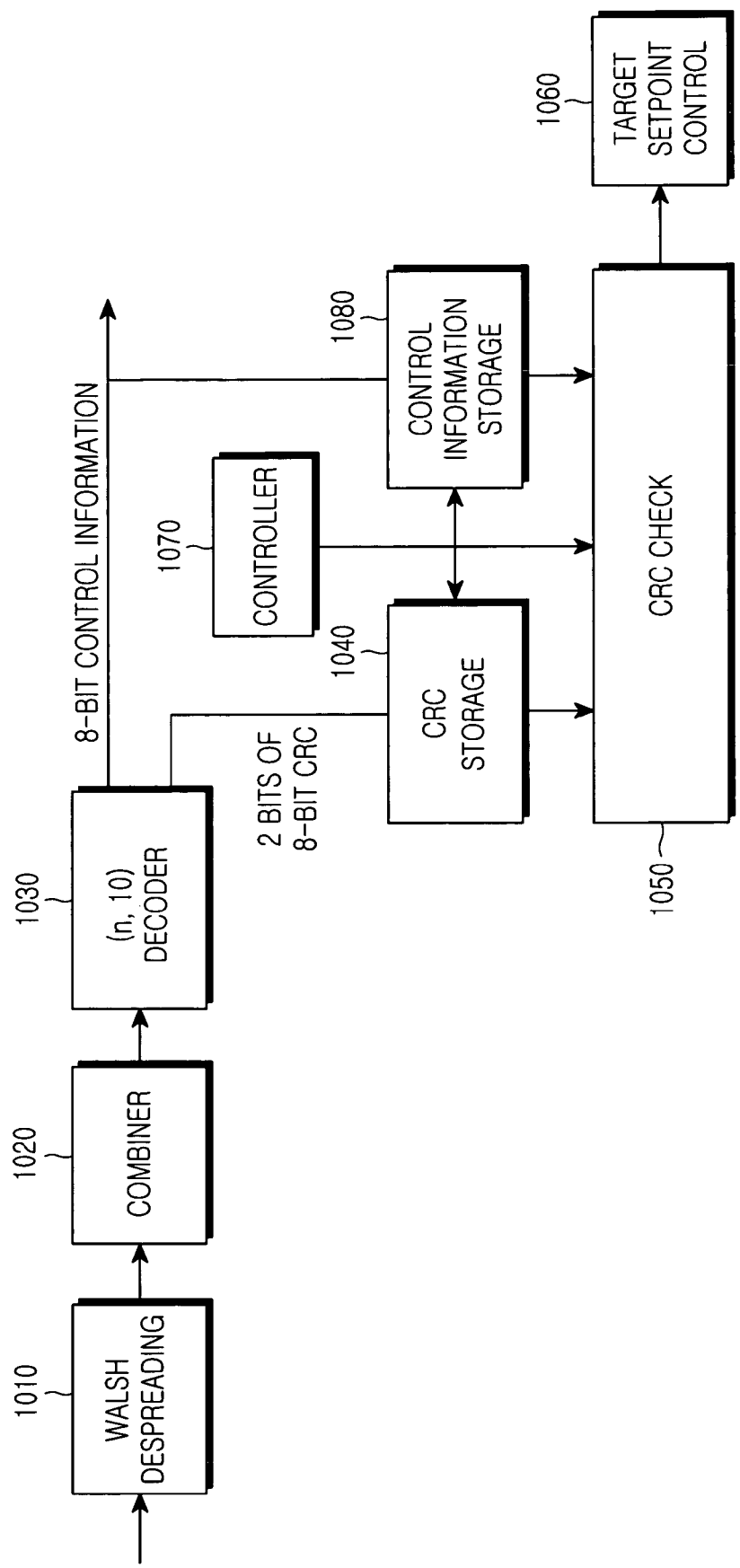
FIG. 10 is a block diagram showing the configuration of a control channel receiver as a counterpart element to the control channel transmitter of FIG. 9.

FIG. 10 is a block diagram showing the configuration of a control channel receiver in a base station for receiving control channel signals according to the second embodiment of the present invention.

FIG. 10 shows the configuration of the control channel receiver in the case where the control information transmitted over a control channel is composed of 8 bits, and an 8-bit CRC is transmitted in every 4 frames with 2 CRC bits being transmitted in each frame.

First, a Walsh despreader 1010 orthogonally despreads a signal received over the control channel, and then a combiner 1020 combines output signals from the Walsh despreader 1010. The combining operation of the combiner 1020 is a counterpart operation to the repeating and puncturing operation of the repeater and puncturer 930 of FIG. 9. Thus, the combiner 1020 recombines the bits repeated by the repeater and puncturer 930. A block decoder 1030 receives and decodes an output signal from the combiner 1020.

As a result of the decoding operation, the block decoder 1030 obtains 8-bit control information and a 2 bit part of the CRC. A control information storage unit 1080 and a CRC storage unit 1040 receive and store the 8-bit control information and the 2 bit part of the CRC, respectively. The reason for providing the storage units 1040 and 1080 is to store the received CRC bits (2 bits received in every frame) until all 8 bits of the CRC are received and stored, so as to perform the CRC check. For example, if an 8-bit CRC has been divided and transmitted 2 bits by 2 bits over the respective control channels of the ith, i+1th, i+2th and i+3th frames, there is a need for the base station receiver to accumulate the 8 CRC bits, which are received 2 bits by 2 bits in the ith, i+1th, i+2th and i+3th frames, in order to perform the CRC check. In order to perform the CRC check, there is also a need for the receiver to store the control information used in generating the 8-bit CRC. For example, if an 8-bit CRC has been divided and transmitted 2 bits by 2 bits over the respective control channels of the ith, i+1th, i+2th and i+3th frames, and the 8-bit CRC has been generated for control information transmitted in the ith frame, then in order to perform the CRC check after receiving the i+3th frame, there is a need for the base station to maintain the control information transmitted in the ith frame until all 8 bits if the CRC is received. On the other hand, if an 8-bit CRC has been divided and transmitted 2 bits by 2 bits over the respective control channels of the ith, i+1th, i+2th and i+3th frames (i.e., a 2-bit CRC part being transmitted in each of the four frames), and the 8-bit CRC has been generated for control information transmitted in the i−3th, i−2th, i−1th and ith frames, then in order to perform the CRC check after receiving the i+3th frame, the base station must store the control information transmitted in the i−3th, i−2th, i−1th and ith frames until all of the CRC bits are received.

When all 8 CRC bits have been received, the base station receiver in FIG. 10 performs the corresponding CRC check at a CRC checker 1050. The CRC check result by the CRC checker 1050 is input to a target setpoint controller 1060, and used to control a target setpoint for the outer loop power control.

The controller 1070 in FIG. 10 controls the CRC storage, CRC check and control information storage operations, performed respectively by the above elements 1040, 1050 and 1080.

As described above, even in the case where outer loop power control is performed based on a CRC generated for control information transmitted in a plurality of frames, it is possible to achieve uniform reception error probability through the outer loop power control, as in the case where the outer loop power control is performed based on a CRC generated for control information transmitted in one frame. One difference between the first and second embodiment is as follows. When a CRC is generated for control information transmitted in a single frame, a CRC check result "CRC pass" or "CRC fail", obtained by performing the CRC check, indicates whether an error has occurred in the single frame. However, when a CRC is generated for control information transmitted in a plurality of frames, the CRC check result indicates whether an error has occurred in at least one of the plurality frames. In this case, in order to achieve the same reception error probability, the target error probability of the outer loop power control must be adjusted depending on the number of frames (i.e., the number of said plurality of frames) used to transmit control information for which a CRC has been generated.

The following is an example of such a method for adjusting the target error probability of the outer loop power control depending on the number of frames used to transmit control information for which a CRC has been generated. If a CRC has been generated using control information transmitted in N frames, and a desired reception error probability is $T_{FER}$, the target error probability (Outer_PC_Error_Rate) of the outer loop power control is given by Equation 1.

$$\text{Outer\_PC\_Error\_Rate} = 1-(1-T_{FER})^N \quad (1)$$

After a target error probability of the outer loop power control is set as expressed in this equation, the CRC check is performed. If the CRC check result indicates that an error has occurred, the target setpoint for the outer loop power control is increased by xdB; otherwise, the target set point is decreased by x÷(1÷Outer_PC_Error_Rate_Rate−1)dB, thereby converging the reception error probability to $T_{FER}$.

Figure 11:
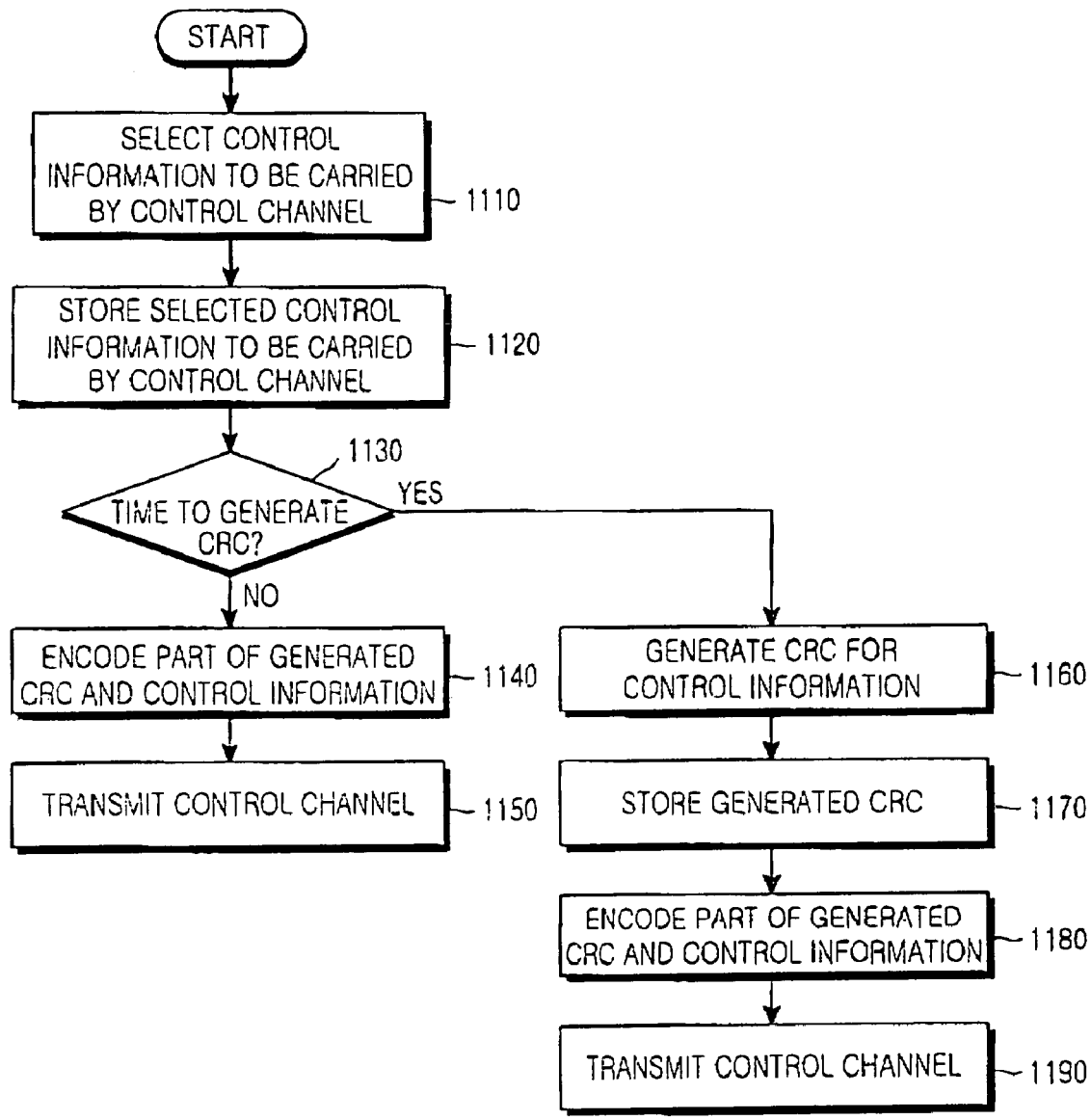
FIG. 11 is a flow chart showing a method for transmitting control information and a CRC from a mobile terminal according to the second embodiment of the present invention.

FIG. 11 is a flow chart showing a method for transmitting control information and a CRC from a mobile terminal according to the second embodiment of the present invention.

As shown in FIG. 11, the mobile terminal selects, at step 1110, control information to be carried by a control channel. Thereafter, at step 1120, the mobile terminal stores the selected control information. The purpose of storing the control information at this step is to deal with the case where a CRC is generated using control information transmitted in a plurality of frames. In order to generate a CRC for control information to be transmitted in a plurality of frames, the control information must be stored until an actual CRC to be transmitted is generated.

After the control information has been stored at the above step 1120, the mobile terminal determines, at step 1130, whether the current frame corresponds to a time to generate a CRC. If the determination at step 1130 is positive, a CRC is generated at step 1160. The CRC generated at this step is stored at step 1170. Then, at step 1180, the generated CRC is divided into a predetermined number of parts, and a part of the divided CRC is encoded together with control information of a corresponding frame. The encoded CRC and control information is transmitted over the control channel at step 1190.

If the determination at the above step 1130 is negative (i.e., if the current frame does not correspond to a time to generate a CRC), the mobile terminal encodes a part of the CRC, which has been stored after being generated in a prior frame, together with control information in the same manner as in the above step 1140. The encoded CRC and control information is transmitted over the control channel at step 1150.

That part of the CRC, which is encoded together with the control information at step 1140 or 1180, is a part of the generated CRC. For example, in the case where an 8-bit CRC is generated and then divided and transmitted in four frames, 2 bits of the 8-bit CRC are encoded, together with the control information, to be transmitted.

Figure 12:
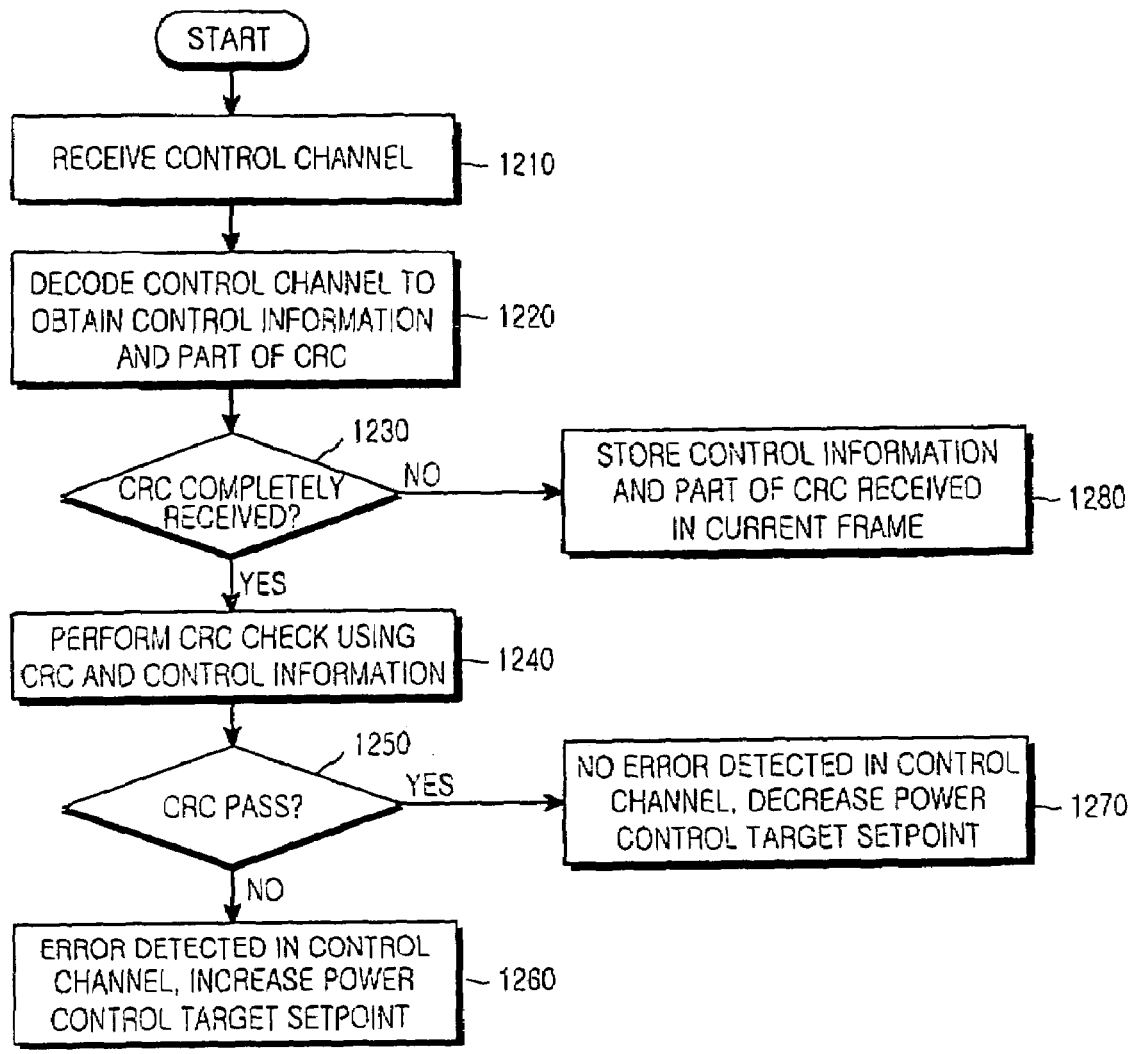
FIG. 12 is a flow chart showing a method for receiving control information and a CRC by a base station according to the second embodiment of the present invention.

FIG. 12 is a flow chart showing a method for receiving control information and a CRC by a base station according to the second embodiment of the present invention.

As shown in FIG. 12, at step 1210, the base station receives a control channel signal transmitted from a mobile terminal. At step 1220, the base station decodes the received control channel signal to obtain the control information and one part of the CRC carried by the control channel signal. Then, at step 1230, the base station (or the base station receiver) determines whether the CRC, divided and transmitted in a plurality of frames, has been completely received. For example, where the CRC is divided into 4 parts and transmitted over the four frames (i.e., the ith, i+1th, i+2th and i+3th frames) as shown in FIG. 8, the base station receiver determines if the i+3th frame has been completely received.

If the determination at step 1230 is negative (i.e., if the CRC, divided and transmitted in the plurality of frames, has not been completely received), the base station stores, at step 1280, control information and the received part of the CRC, received in the current frame, in a storage unit. After all parts of the CRC, divided and transmitted in the plurality frames, have been received, each of the received parts of the CRC is contained to recover the CRC. The recovered CRC is then used to perform a CRC check to determine whether an error has occurred.

If the determination at step 1230 is positive (i.e., if the CRC, divided and transmitted in the plurality of frames, has been completely received), the base station performs, at step 1240, the CRC check to determine whether there is an error, based both on the control information and part of the CRC received in the current frame, and on the control information and parts of the CRC, which have been received and stored in the previous frames.

If the CRC check result at step 1250 is "CRC pass" indicating that no error is detected, the base station receiver decreases the target setpoint for the outer loop power control at step 1270. On the contrary, if the CRC check result at step 1250 is "CRC fail" indicating that an error has been detected, the base station receiver increases the target setpoint for the outer loop power control at step 1260.

3. Third Embodiment

Figure 13:
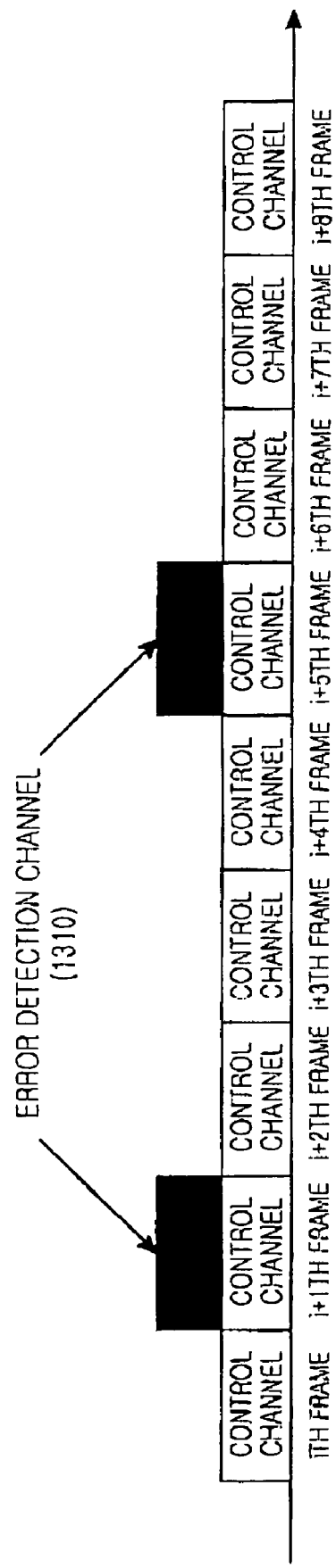
FIG. 13 is a diagram illustrating the transmission of control information and a CRC from a mobile terminal according to a third embodiment of the present invention.

FIG. 13 is a diagram illustrating the transmission of control information and a CRC from a mobile terminal according to a third embodiment of the present invention. As shown in FIG. 13, the mobile terminal transmits control information in every frame over a control channel, whereas it transmits a CRC for the control information in every predetermined period of frames over an additional error detection channel. In the example shown in FIG. 3, the control information is transmitted in every frame over a control channel, whereas a CRC is transmitted in every four frames over an error detection channel. In this example, the control channel carries only the 8-bit control information, i.e., does not carry the CRC. Accordingly, the same amount of data is transmitted in all frames of the control channel, and thus the same encoding scheme is applied to all the frames. As a separate channel from the control channel, the error detection channel is used to transmit a CRC for the control information, transmitted in the same time interval, from the mobile terminal to the base station.

In the embodiment described in FIG. 3, the mobile terminal transmits the CRC and the control information, both being encoded together, in a time interval during which the CRC is transmitted. In the embodiment described in FIG. 13, the mobile terminal transmits the CRC and the control information, both being separately encoded, in the time interval during which the CRC is transmitted. In other words, in each of the i+1th and i+5th frames, the control information and the CRC are respectively transmitted over the control channel and the error detection channels, as shown in FIG. 13, whereas in each of the remaining frames, only the control information is transmitted over the control channel without using the error detection channel.

This embodiment has been described with reference to the case where each of the i+1th and i+5th frames is used to transmit a CRC for control information transmitted in the same time interval. However, according to a fourth embodiment, each of the i+1th and i+5th frames may be used to transmit a CRC for a plurality of control information transmitted in a plurality of frames. For example, a CRC for control information transmitted during the i−2th, i−1th, ith and i+1th frames is transmitted in the i+1th frame over the error detection channel, whereas a CRC for control information transmitted during the i+2th, i+3th, i+4th and i+5th frames is transmitted in the i+5th frame over the error detection channel.

Figure 14:
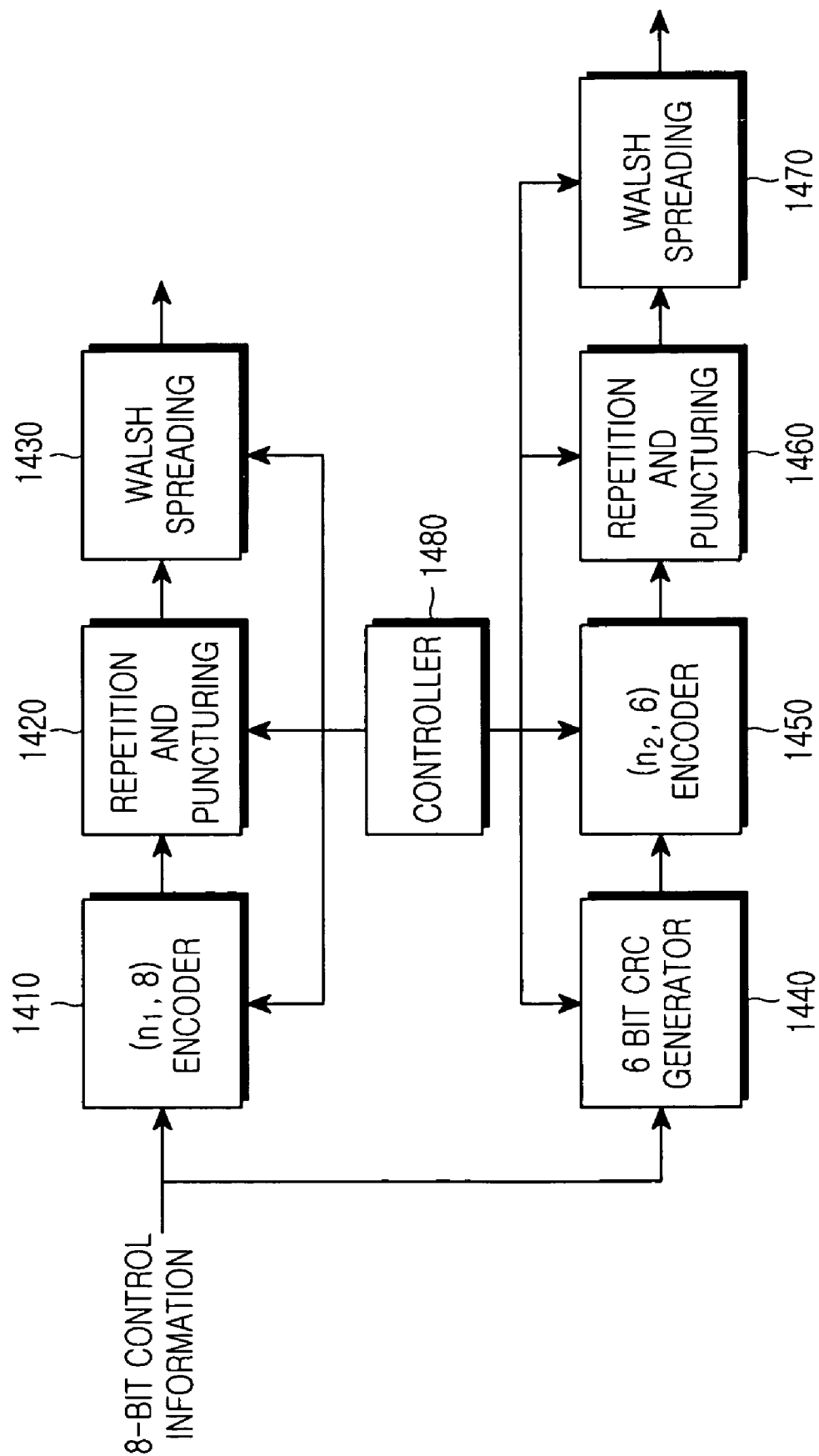
FIG. 14 is a block diagram showing the configuration of control channel and error detection channel transmitter for transmitting a control channel signal and an error detection channel signal from a mobile terminal according to the third embodiment of the present invention.

FIG. 14 is a block diagram showing the configuration of a control channel and error detection channel transmitter for transmitting a control channel signal and an error detection channel signal from a mobile terminal according to the third embodiment of the present invention. Here, it is assumed that control information transmitted over the control channel is composed of 8 bits. The 8-bit control information includes, for example, various types of information relating to the HARQ and the data rate of a traffic channel in a 1×EVDO system. Elements 1410, 1420 and 1430 (i.e., a block encoder 1410, a repeater/puncturer 1420 and a Walsh spreader 1430) are used to transmit the 8-bit control information. A 6-bit CRC generated for at least one predetermined recent control information is transmitted over an error detection channel. Elements 1440, 1450, 1460 and 1470 (i.e., a CRC generator 1440, a block encoder 1450, a repeater/puncturer 1460 and a Walsh spreader 1470) are used to transmit the 6-bit CRC.

In every time interval, the block encoder 1410 block-encodes the 8-bit control information at a predetermined code rate ($n_1$, 8). An output of the block encoder 1410 is repeated and punctured by the repeater/puncturer 1420, and then orthogonally spread (for example, with orthogonal codes) by the Walsh spreader 1430 so that the final signal can be transmitted over the control channel.

During a time interval defined for transmitting the CRC, the CRC generator 1440 additionally operates to receive not only the current control information but also at least one predetermined previous control information, and then to generate and output a corresponding 6-bit CRC. The block encoder 1450 encodes an output of the CRC generator 1440 at a predetermined code rate ($n_2$, 6). An output of the block encoder 1450 is repeated and punctured by the repeater/puncturer 1460, and it is then orthogonally spread by the Walsh spreader 1470 so that it can be transmitted over the error detection channel.

Thus, during the time interval defined for transmitting the CRC, the receiver outputs not only the CRC but also control information passing through the block encoder 1410, the repeater/puncturer 1420 and the Walsh spreader 1430.

A controller 1480 controls the operations of the above elements, and particularly determines whether to transmit a CRC in every frame. If it is determined to transmit the CRC, the controller 1480 enables the elements 1440, 1450, 1460 and 1470. The controller 1480 makes the determination based on a prescribed rule.

Figure 15:
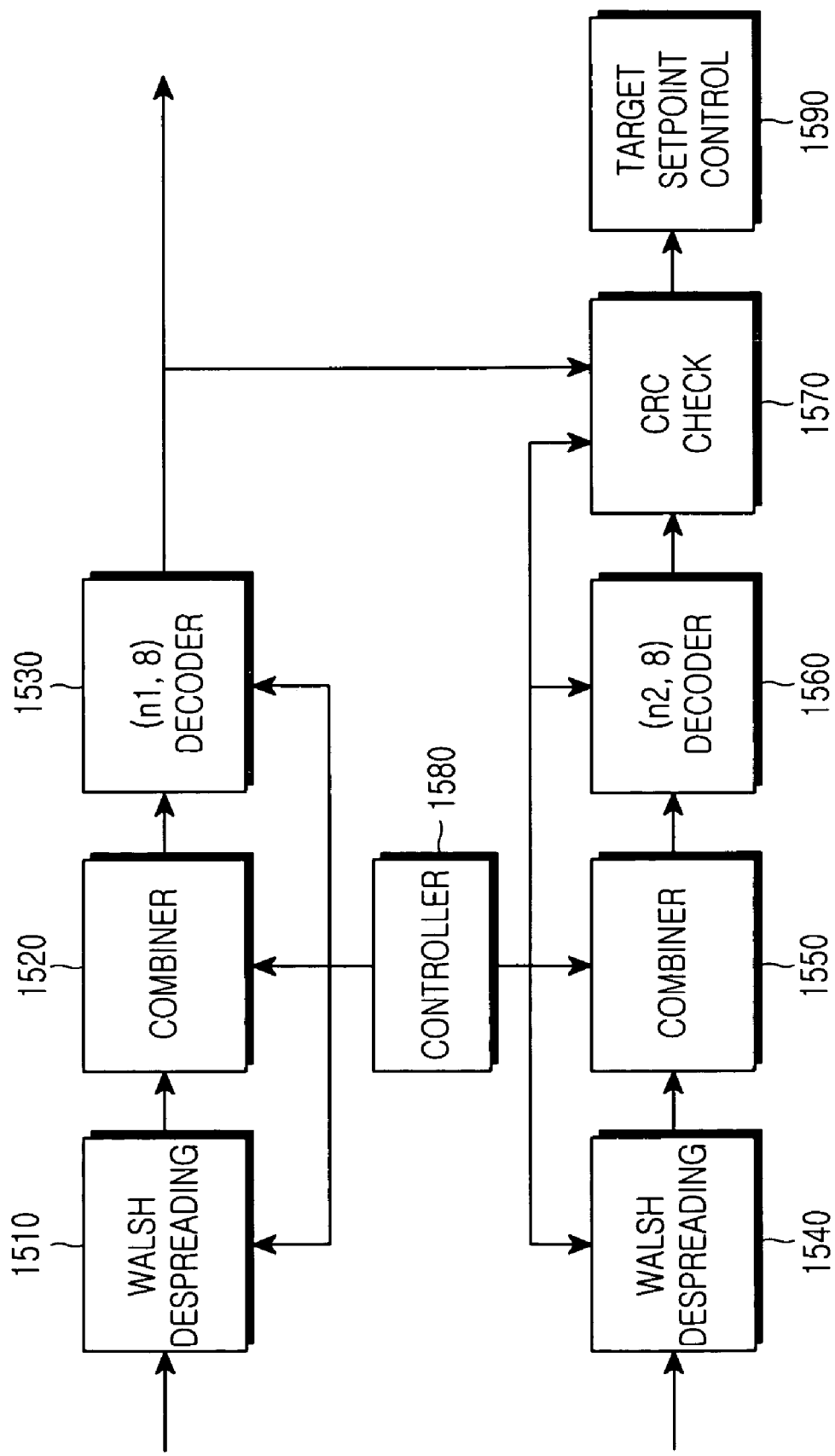
FIG. 15 is a block diagram showing the configuration of a control channel and error detection channel receiver as a counterpart element to the control channel and error detection channel transmitter of FIG. 14.

FIG. 15 is a block diagram showing the configuration of a receiver for receiving a control channel signal and an error detection channel signal, which is a counterpart element to the control channel and error detection channel transmitter of FIG. 14. In FIG. 15, elements 1510, 1520 and 1530 (i.e., a Walsh despreader 1510, a combiner 1520 and a block decoder 1530) are used to receive control information over the control channel, whereas elements 1540, 1550, 1560 and 1570 (i.e., a Walsh despreader 1540, a combiner 1550, a block decoder 1560 and a CRC checker 1570) are used to receive a CRC over the error detection channel.

In FIG. 15, in every time interval, the Walsh despreader 1510 orthogonally despreads a received control channel signal, and the combiner 1520 combines outputs of the Walsh despreader 1510 at a predetermined time. The combining operation of the combiner 1520 is a counterpart operation to the repeating and puncturing operation of the repeater and puncturer 1420 of FIG. 14. Thus, the combiner 1520 recombines symbols repeated by the repeater and puncturer 1420. The block decoder 1530 decodes a combined signal outputted from the combiner 1520 in a manner corresponding to the code rate ($n_1$, 6) of the block encoder 1410 in FIG. 14, and then outputs the control information.

In the time interval defined for transmitting the CRC, the Walsh despreader 1540 orthogonally despreads a received error detection channel signal, and the combiner 1550 combines the output of the Walsh despreader 1540 at a predetermined time. The combining operation of the combiner 1550 is a counterpart operation to the repeating and puncturing operation of the repeater and puncturer 1460 of FIG. 14. Thus, the combiner 1550 recombines symbols repeated by the repeater and puncturer 1460. The block decoder 1560 decodes a combined signal outputted from the combiner 1550 in a manner corresponding to the code rate ($n_2$, 6) of the block encoder 1450 in FIG. 14, and then outputs a CRC. The CRC checker 1570 checks the CRC to determine whether there is an error in at least one control information outputted from the block decoder 1530 at least one predetermined recent frame. A target setpoint controller 1590 adjusts a power control target setpoint according to the determination by the CRC checker 1570. If an error has occurred in the control information, the controller 1590 increases a target setpoint for the outer loop power control, and if no error is detected, the target set point controller 1590 decreases the target setpoint.

A controller 1580 controls the operations of the above elements. In particular, in every frame, the controller 1580 determines whether the current time interval is a time interval in which the CRC is received. If the determination is positive, the controller 1580 enables the elements 1540, 1550, 1560, 1570 and 1590 for receiving the error detection channel signal. The control information obtained by the receiver of FIG. 15 is used for the base station to obtain information relating to the HARQ and the data rate when it receives a reverse traffic channel signal.

In the first and second embodiments, an encoding scheme used for a time interval in which a CRC is transmitted is different from that of a time interval in which no CRC is transmitted. Thus, when a CRC check is performed to determine whether there is an error, and outer loop power control is performed based on the determination, error probability can be maintained at a desired level in the time interval in which the CRC is transmitted, whereas error probability cannot be maintained at a desired level in the time interval in which no CRC is transmitted.

In the third embodiment, a CRC is separately encoded, and control information is transmitted using the same encoding scheme irrespective of whether or not the CRC is transmitted. It is burdensome for this embodiment to operate the additional channel (i.e., the error detection channel). However, by performing a CRC check in the time interval in which the CRC is received to determine whether there is an error, and then performing outer loop power control according to the determination, it is possible to maintain a uniform error probability of the control channel at a desired level in every time interval. This is because the performance evaluation through periodical CRC checks can be applied to every time interval since the same encoding scheme is used for continuously transmitted control information and a different encoding scheme is used for discontinuously transmitted CRCs. That is, if control channel error probability is maintained at 1% in the time interval in which the CRC is transmitted, the error probability is also maintained at 1% in the remaining time interval.

Figure 16:
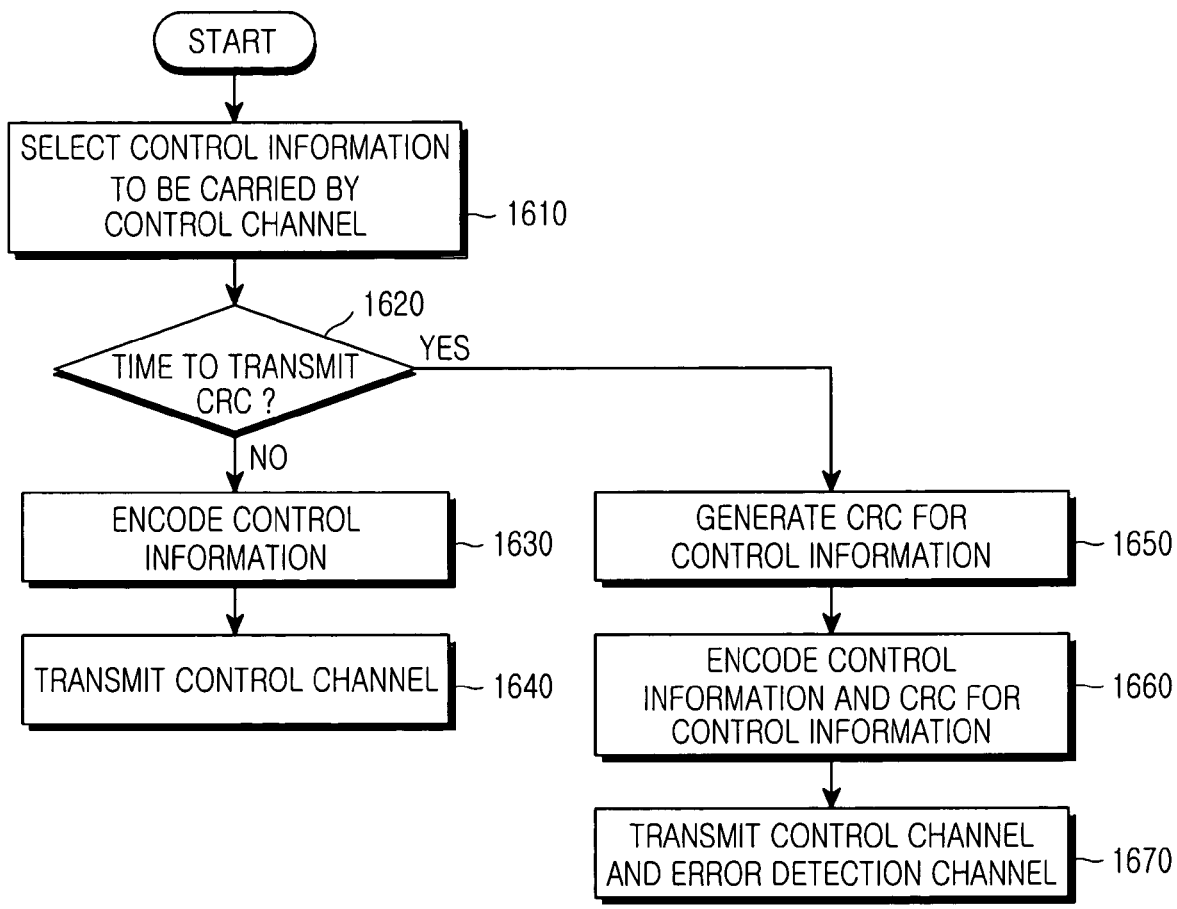
FIG. 16 is a flow chart showing a method for transmitting control information and a CRC from a mobile terminal according to the third embodiment of the present invention.

FIG. 16 is a flow chart showing a method for transmitting control information and a CRC from a mobile terminal according to the third embodiment of the present invention.

As shown in FIG. 16, at step 1610, the mobile terminal selects control information to be carried by the control channel. Then, at step 1620, the mobile terminal determines if the current time interval is a time interval in which the error detection channel will be used. If this determination is negative, the mobile terminal encodes the control information at step 1630, and transmits the encoded control information at step 1640. On the other hand, if the determination at step 1620 is positive (i.e., if the current time interval is the time interval in which the error detection channel will be used), the mobile terminal generates a CRC for at least one predetermined recent control information at step 1650. Then, the mobile terminal enables not only the elements 1410, 1420 and 1430 but also the elements 1440, 1450, 1460 and 1470 shown in FIG. 14, and encodes the generated CRC and control information of the current time interval at step 1660, and transmits the encoded CRC over the error detection channel and the encoded control information over the control channel and at step 1670.

Figure 17:
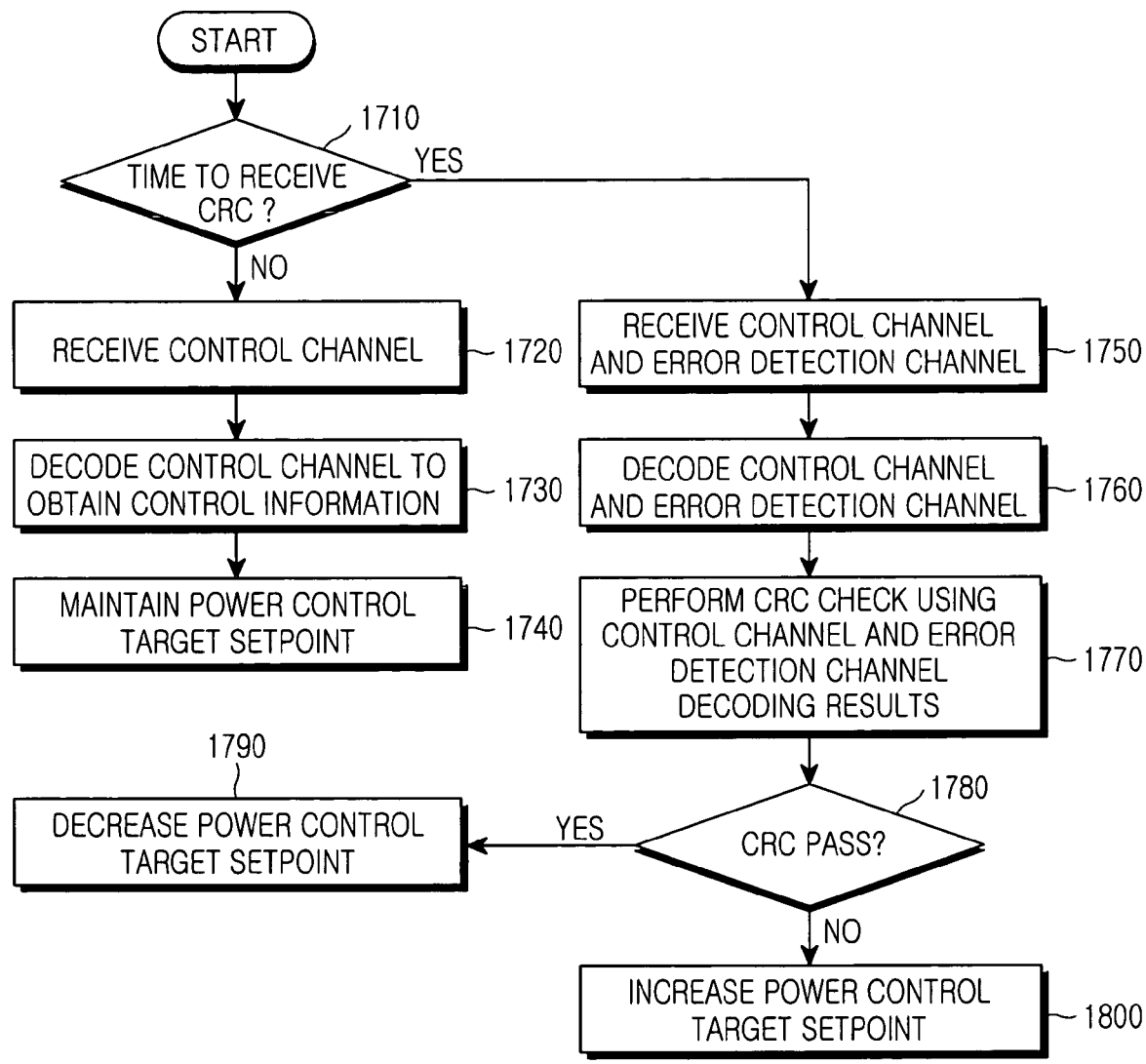
FIG. 17 is a flow chart showing a method for receiving control information and a CRC by the base station according to the third embodiment of the present invention.

FIG. 17 is a flow chart showing a method for receiving control information and a CRC by the base station according to the third embodiment of the present invention.

As shown in FIG. 17, the base station determines, at step 1710, if the current time interval is a time interval in which the error detection channel is used. In order to make this determination, the base station must share a rule used for the mobile terminal to determine, at said step 1620 in FIG. 16, during what time interval the error detection channel is used. In other words, the determination as to during what time interval the error detection channel is to be used must be based on a common rule prescribed between the base station and the mobile terminal.

If the determination at said step 1710 is negative (i.e., if the current time interval is a time interval in which no error detection channel is used), the base station enables, at step 1720, only the elements 1510, 1520 and 1530 of FIG. 15 to receive only a control channel signal, and then decodes the received control channel signal at step 1730 to obtain the control information. Then, at step 1740, the target setpoint for the outer loop power control is maintained at the same level as the previous time interval.

If the determination at said step 1710 is positive (i.e., if the current time interval is a time interval in which the error detection channel is used), the base station enables, at step 1750, not only the elements 1510, 1520 and 1530 but also the elements 1540, 1550, 1560 and 1570 of FIG. 15 to receive a control channel signal and an error detection channel signal, and decodes, at step 1760, each of the received control channel signal and the received error detection channel signal to obtain a CRC for at least one recent control information and the control information of the current time interval. Then, the base station checks, at step 1770, the obtained CRC, and determines, at step 1780, whether there is an error in the at least one recent control information.

If the determination at step 1780 (based on the CRC check result) is that there is no error in the at least one recent control information (i.e., if the CRC check result is "CRC OK"), the base station decreases, at step 1790, the target setpoint for the outer loop power control by a predetermined level, relative to the previous time interval. If the determination at step 1780 is that there is an error in the at least one recent control information (i.e., if the CRC check result is "CRC FAIL"), the base station increases, at step 1800, the target setpoint for the outer loop power control by a predetermined level, relative to the previous time interval.

In the third embodiment described above, one CRC is transmitted while occupying a time interval corresponding to only one frame. On the other hand, in a fourth embodiment, a modification of the third embodiment, one CRC is transmitted while occupying a time interval corresponding to a plurality of frames. The plurality of frames correspond to frames transmitted within one transmission interval of error detection channels.

4. Fourth Embodiment

Figure 18:
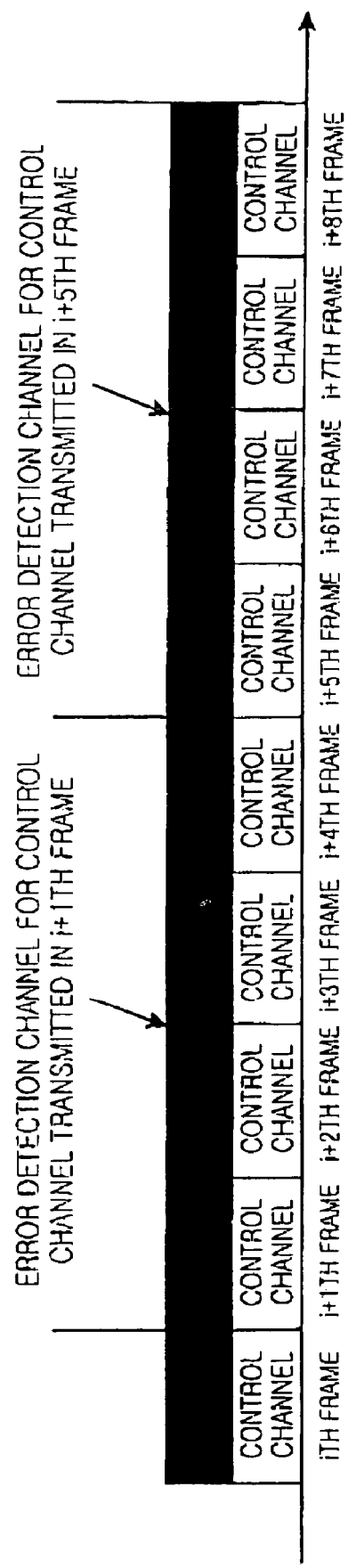
FIG. 18 is a diagram illustrating the transmission of control information and a CRC from a mobile terminal according to a fourth embodiment of the present invention.

FIG. 18 illustrates the transmission of control information and a CRC from a mobile terminal according to the fourth embodiment of the present invention. As shown, one CRC transmitted over an error detection channel is transmitted while occupying a time interval corresponding to four frames. In other words, a CRC for control information transmitted in the i+1th frame is transmitted while occupying a time interval corresponding to the i+1th to i+4th frames.

The error detection channel transmission method according to the fourth embodiment has the following advantages. First, as the time interval occupied by the CRC increases, the performance of receiving error detection channels increases due to time diversity. Second, as the error detection channel signal is dispersed over a number of frames, interference caused by the error detection channel is also dispersed over a number of frames, so that reverse system capacity can be increased in the case where a plurality of mobile terminals simultaneously transmit error detection channels.

Figure 19:
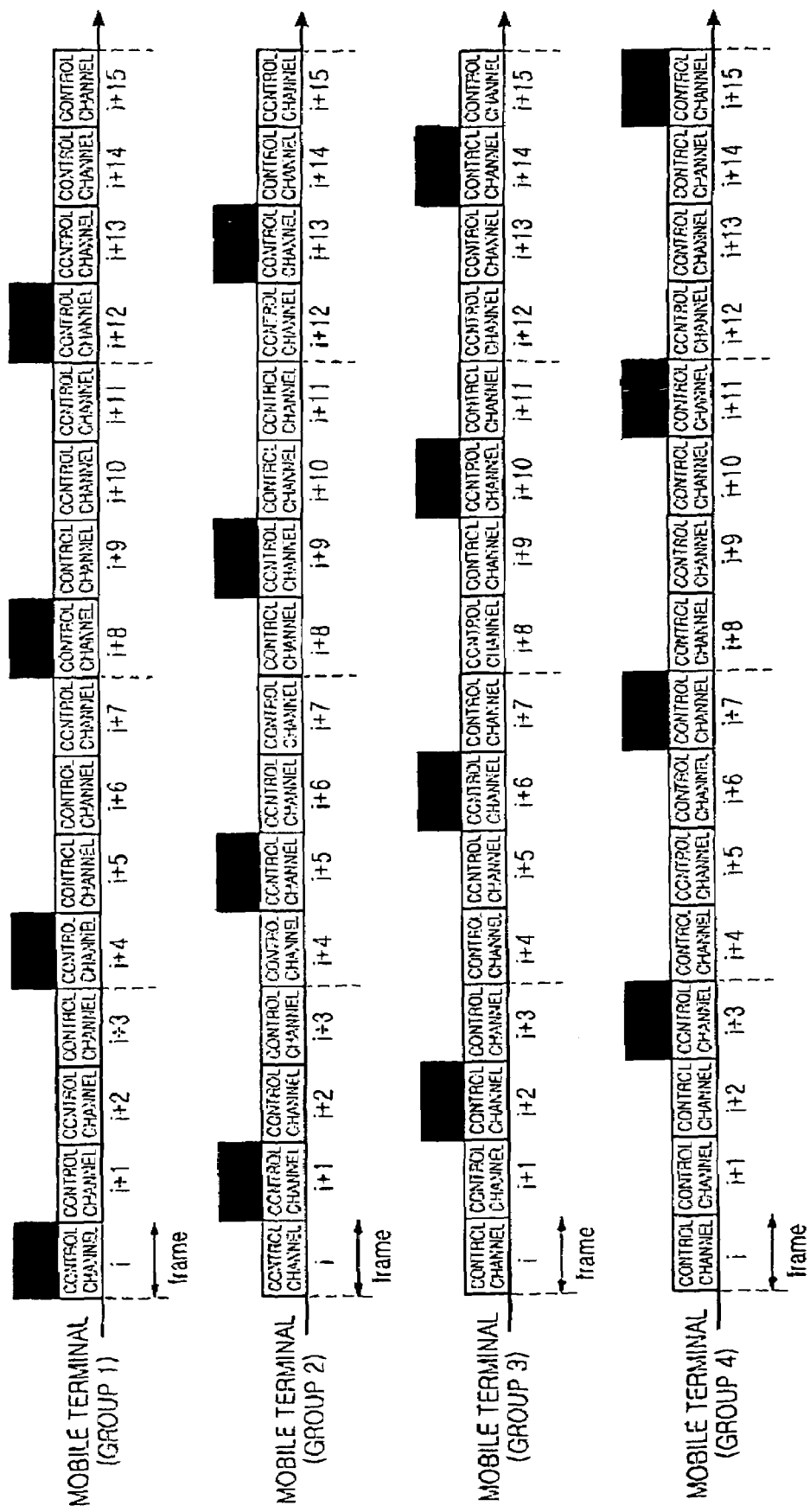
FIG. 19 is a diagram illustrating the transmission of control information and a CRC from a plurality of mobile terminals according to the fourth embodiment of the present invention.

FIG. 19 illustrates the transmission of control information and a CRC from a plurality of mobile terminals according to the fourth embodiment of the present invention. Mobile terminals in communication with one base station to transmit reverse control channel signals and reverse error detection channel signals are divided into 1st, 2nd, 3rd and 4th groups. Each mobile terminal in a group uses an error detection channel in a time interval allocated to its group. The respective time intervals of the error detection channel signals transmitted by the mobile terminals are set to be as different as possible so that interference caused by the error detection channel can be dispersed, thereby increasing the reverse system capacity.

5. Fifth Embodiment

Figure 20:
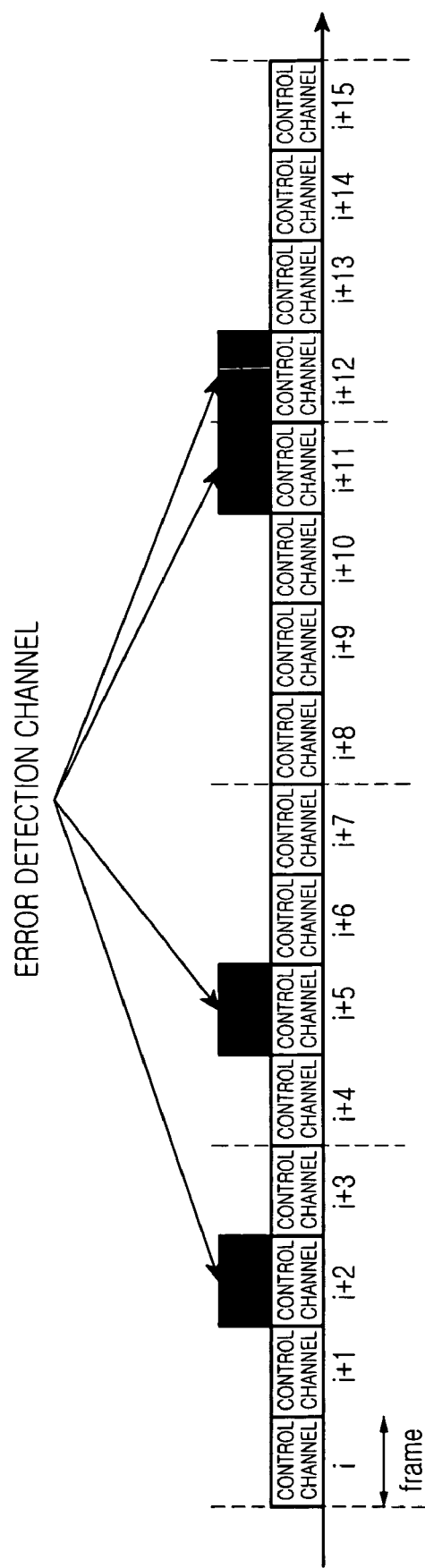
FIG. 20 is a diagram illustrating random CRC transmission from a mobile terminal according to a fifth embodiment of the present invention.

FIG. 20 illustrates random CRC transmission from a mobile terminal according to a fifth embodiment of the present invention. In this embodiment, the mobile terminal transmits control information in every frame while transmitting a CRC in a frame randomly selected from a predetermined period of frames. In other words, a frame in which the CRC is transmitted randomly varies in every frame period (in every 4 frames in this example). If the mobile terminal transmits the CRC in such a random manner, the possibility of simultaneous CRC transmission from a plurality of mobile terminals in a specific time interval is reduced even when a number of mobile terminals transmit error detection channel signals. This process results in the interference due to the error detection channel being dispersed. Here, a rule for the mobile terminal to select a frame in which the CRC is transmitted must be previously prescribed between the mobile and the base station or be detectable by the base station.

6. Sixth Embodiment

Figure 21:
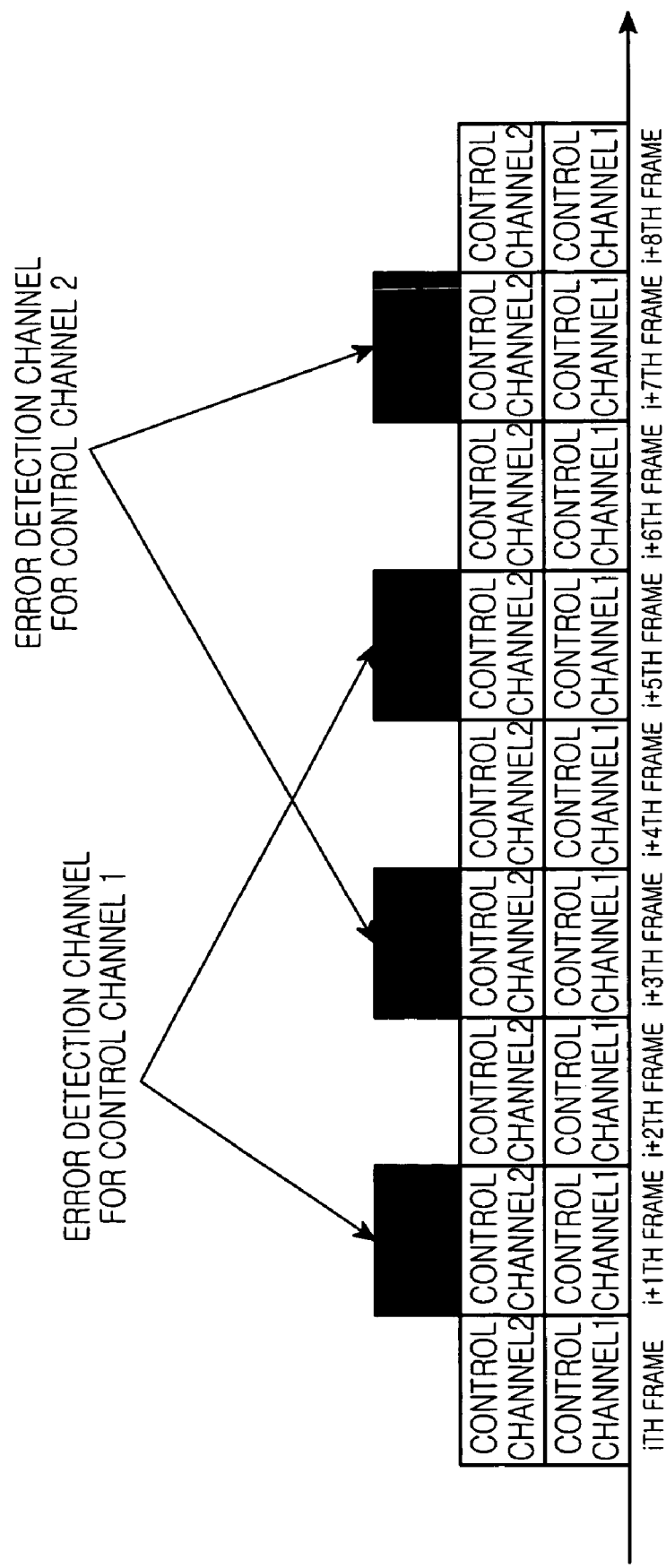
FIG. 21 is a diagram illustrating a method for transmitting CRCs for a plurality of control channels by a mobile terminal according to a sixth embodiment of the present invention.

FIG. 21 shows a method for transmitting CRCs for a plurality of control channels by a mobile terminal according to a sixth embodiment of the present invention. The control channels (or control channel signals) transmitted by the mobile terminal include 1st and 2nd control channels (Control Channels 1 and 2) that are differentiated with different spread codes. This is to enable transmission of a larger amount of control information. If two or more control channels are transmitted and a different encoding scheme is used for each of the control channels, the mobile terminal transmits two or more error detection channels corresponding to the two or more control channels. In FIG. 21, a CRC for the 1st control channel is transmitted in the i+1th and i+5th frames, whereas a CRC for the 2nd control channel is transmitted in the i+3th and the i+7th frames. In the same manner as described above, information relating to which frame or frames are being allocated to the error detection channel for each control channel is prescribed between the base station and the mobile terminal.

As apparent from the above description, according to the present invention, when a mobile terminal transmits control information of a traffic channel to a base station over a control channel, it transmits error detection information for the control information over the control channel or a separate error detection channel. The present invention thus has an advantage in that the base station can perform outer loop power control on the basis of the error detection information for the control information.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for transmitting error detection information for control information of a reverse traffic channel from a mobile station in a mobile communication system, said mobile station transmitting the control information of the reverse traffic channel over a control channel, the method comprising the steps of:

generating control information of a reverse traffic channel in every time interval;

generating error detection information for error detection of at least one generated control information;

transmitting the generated error detection information and the control information in a predetermined time interval; and transmitting the control information in a remaining time interval, other than said predetermined time interval.

2. The method according to claim 1, wherein said predetermined time interval is repeated at intervals of a predetermined period.

3. The method according to claim 1, wherein said predetermined time interval is arranged in a predetermined period to minimize interference caused by the error detection information.

4. The method according to claim 1, further comprising the step of:

encoding the generated error detection information together with the control information, and transmitting the encoded information over a control channel.

5. The method according to claim 1, further comprising the step of:

transmitting the generated error detection information over an error detection channel different from the control channel.

6. The method according to claim 5, wherein the generated error detection information is transmitted over the error detection channel in a randomly arranged time interval.

7. The method according to claim 1, wherein the generated error detection information is transmitted in a time interval allocated to a group to which the mobile station belongs.

8. The method according to claim 1, wherein said step of generating the error detection information includes the steps of:

storing the control information of the reverse traffic channel;

determining if the current time is a time to generate the error detection information for the control information; and generating error detection information for the stored control information if the current time is the time to generate the error detection information.

9. The method according to claim 8, wherein the stored control information includes at least one control information.

10. An apparatus for transmitting error detection information for control information of a reverse traffic channel from a mobile station in a mobile communication system, said mobile station transmitting the control information of the reverse traffic channel over a control channel, the apparatus comprising:

a control information generator for generating control information of a reverse traffic channel in every time interval;

an error detection information generator for generating error detection information for error detection of at least one generated control information; and a controller for allowing the generated error detection information and the control information to be transmitted in a predetermined time interval, and allowing the control information to be transmitted in a remaining time interval, other than said predetermined time interval.

11. The apparatus according to claim 10, wherein said predetermined time interval is repeated at intervals of a predetermined period.

12. The apparatus according to claim 10, wherein said predetermined time interval is arranged in a predetermined period to minimize interference caused by the error detection information.

13. The apparatus according to claim 10, further comprising an encoder for encoding error detection information, generated in said predetermined time interval, together with the control information.

14. The apparatus according to claim 10, further comprising a sub-encoder for encoding the generated error detection information, separately from the control information.

15. The apparatus according to claim 14, wherein the controller allows the error detection information to be transmitted in a randomly arrange time interval.

16. The apparatus according to claim 10, wherein the controller allows the error detection information to be transmitted in a time interval allocated to a group to which the mobile station belongs.

17. A method for receiving error detection information for control information of a reverse traffic channel in a base station of a mobile communication system, said base station receiving the control information of the reverse traffic channel, the method comprising the steps of:

receiving the control information and error detection information for error detection of at least one control information in a predetermined time interval;

receiving the control information in a remaining time interval, other than said predetermined time interval; and determining, based on the received error detection information, if an error exists in said at least one control information.

18. The method according to claim 17, wherein said predetermined time interval is repeated at intervals of a predetermined period.

19. The method according to claim 17, wherein said predetermined time interval is arranged in a predetermined period to minimize interference caused by the error detection information.

20. The method according to claim 17, wherein said step of receiving the control information and the error detection information includes the step of receiving the control information and the error detection information over an control channel.

21. The method according to claim 17, further comprising the step of receiving the error detection information over an error detection channel different from the control channel.

22. The method according to claim 21, wherein the error detection information is received over the error detection channel in a randomly arranged time interval.

23. The method according to claim 17, wherein the error detection information is received from a mobile terminal in a time interval allocated to a group to which the mobile terminal belongs.

24. The method according to claim 17, further comprising the step of decoding a received signal of a control channel in a predetermined time interval to obtain control information and error detection information.

25. The method according to claim 17, further comprising the step of adjusting a target setpoint for outer loop power control, depending on the determination at said step of determining if the error exists in said at least one control information.

26. The method according to claim 17, further comprising the steps of decoding a received signal of a control channel in a remaining time interval, other than said predetermined time interval, to generate control information, and maintaining a target setpoint for outer loop power control.

27. An apparatus for receiving error detection information for control information of a reverse traffic channel in a base station of a mobile communication system, said base station receiving the control information of the reverse traffic channel, the apparatus comprising:

a first decoder for decoding control information and error detection information received in a predetermined time interval;

a second decoder for generating control information in a remaining time interval, other than said predetermined time interval; and an error checker for determining, based on the decoded error detection information, whether an error exists in at least one control information.

28. The apparatus according to claim 27, further comprising a target setpoint controller for adjusting a target setpoint for outer loop power control, depending on the determination as to whether the error exists in said at least one control information.

29. The apparatus according to claim 27, further comprising a controller for determining if the current time is in the predetermined time interval or the remaining time interval, and selecting and enabling one of the first and second decoders, depending on the determination as to whether the current time is in the predetermined time interval or the remaining time interval.

30. The apparatus according to claim 27, wherein said predetermined time interval is repeated at intervals of a predetermined period.

31. An apparatus for receiving error detection information for control information of a reverse traffic channel in a base station of a mobile communication system, said base station receiving the control information of the reverse traffic channel, the apparatus comprising:

a first decoder for decoding control information received over a control channel in every time interval;

a second decoder for decoding error detection information received over an error detection channel in a predetermined time interval, said error detection information being used for error detection of at least one control information; and an error checker for determining, based on the error detection information received over the error detection channel, if an error exists in said at least one control information.

32. The apparatus according to claim 31, wherein the second decoder decodes error detection information received over the error detection channel in a randomly arranged time interval.

33. The apparatus according to claim 31, wherein the second decoder decodes error detection information received from a mobile terminal in a time interval allocated to the mobile terminal.

34. The apparatus according to claim 31, further comprising a target setpoint controller for adjusting a target setpoint for outer loop power control, depending on the determination as to whether the error exists in said at least one control information.

35. A method for transmitting error detection information for control information of a reverse traffic channel from a mobile station in a mobile communication system, said mobile station transmitting the control information of the reverse traffic channel over a control channel, the method comprising the steps of:

generating control information of a reverse traffic channel in every time interval;

generating error detection information for use in determining if an error exists in at least one selected control information;

dividing the generated error detection information in a predetermined time interval, and transmitting the divided error detection information and the generated control information.

36. The method according to claim 35, further comprising the step of determining if the current time is a time to generate error detection information for said at least one control information.

37. The method according to claim 35, further comprising the step of encoding error detection information and control information and transmitting the encoded information over a control channel.

38. The method according to claim 35, wherein the control information is transmitted over a control channel, and the error detection information is transmitted over an error detection channel.

39. An apparatus for transmitting error detection information for control information of a reverse traffic channel from a mobile station in a mobile communication system, said mobile station transmitting the control information of the reverse traffic channel over a control channel, the apparatus comprising:

a control information storage unit for generating and storing control information of a reverse traffic channel in every time interval;

an error detection information storage unit for storing error detection information for error detection of at least one control information; and a controller for allowing the error detection information to be divided in a predetermined time interval, and allowing the divided error detection information and the generated control information to be transmitted.

40. The apparatus according to claim 39, wherein the controller allows the error detection information and the control information to be encoded and transmitted over a control channel.

41. The apparatus according to claim 39, wherein the control information is transmitted over a control channel, and the error detection information is transmitted over an error detection channel.

42. A method for receiving error detection information for control information of a reverse traffic channel in a base station of a mobile communication system, said base station receiving the control information of the reverse traffic channel, the method comprising the steps of:

receiving control information of a reverse traffic channel in every time interval;

receiving error detection information for error detection of at least one received control information, said error detection information being received while being divided in a predetermined time interval; and determining whether an error exists in said at least one control information, when all of the divided error detection information has been received.

43. The method according to claim 42, further comprising the step of receiving error detection information and control information over an encoded control channel.

44. The method according to claim 42, wherein the control information is received over a control channel, and the error detection information is received over an error detection channel.

45. The method according to claim 42, further comprising the step of adjusting a target setpoint for outer loop power control, depending on the determination as to whether the error exists in said at least one control information.

46. An apparatus for receiving error detection information for control information of a reverse traffic channel in a base station of a mobile communication system, said base station receiving the control information of the reverse traffic channel, the apparatus comprising:

a control information storage unit for receiving and storing control information of a reverse traffic channel in every time interval;

an error detection information storage unit for storing error detection information for error detection of at least one received control information, said error detection information being received while being divided in a predetermined time interval; and an error detection determiner for determining whether an error exists in said at least one control information, when all of the divided error detection information has been received.

47. The apparatus according to claim 46, wherein the error detection information and the control information is received over an encoded control channel.

48. The apparatus according to claim 46, wherein the control information is received over a control channel, and the error detection information is received over an error detection channel.

49. The method according to claim 46, further comprising a target setpoint for adjusting a target setpoint for outer loop power control, depending on the determination as to whether the error exists in said at least one control information.

50. The method according to claim 5, wherein the generated error detection information is transmitted in a time interval allocated to a group to which the mobile station belongs.

51. The apparatus according to claim 14, wherein the controller allows the error detection information to be transmitted in a time interval allocated to a group to which the mobile station belongs.

52. The method according to claim 21, wherein the error detection information is received from a mobile terminal in a time interval allocated to a group to which the mobile terminal belongs.

* * * * *